US012034216B2

(12) United States Patent
Lee et al.

(10) Patent No.: US 12,034,216 B2
(45) Date of Patent: Jul. 9, 2024

(54) PIVOTING MILLIMETER-WAVE ANTENNA ASSEMBLY AND CORRESPONDING ELECTRONIC DEVICES AND METHODS

(71) Applicant: Motorola Mobility LLC, Chicago, IL (US)

(72) Inventors: Ngee J Lee, Park Ridge, IL (US); Mohammed Abdul-Gaffoor, St. Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/676,138

(22) Filed: Feb. 19, 2022

(65) Prior Publication Data

US 2023/0268665 A1 Aug. 24, 2023

(51) Int. Cl.

| | |
|---|---|
| ***H01Q 21/00*** | (2006.01) |
| ***H01Q 3/06*** | (2006.01) |
| ***H01Q 3/08*** | (2006.01) |

(52) U.S. Cl.
CPC ........... *H01Q 21/0075* (2013.01); *H01Q 3/06* (2013.01); *H01Q 3/08* (2013.01)

(58) Field of Classification Search
CPC .................................................... H01Q 1/1257
USPC .......................................................... 343/702
See application file for complete search history.

(56) References Cited

U.S. PATENT DOCUMENTS

| | | | | |
|---|---|---|---|---|
| 7,362,276 B2 * | 4/2008 | Liao | H01Q 3/08 | 343/702 |
| 10,553,929 B2 * | 2/2020 | Patel | H01Q 1/1264 | |
| 10,651,566 B2 * | 5/2020 | Adams | G01S 13/02 | |
| 11,101,553 B2 * | 8/2021 | Adada | H01Q 3/08 | |
| 11,271,321 B1 * | 3/2022 | West | H01Q 5/55 | |
| 2008/0211723 A1 * | 9/2008 | Tsubono | H01Q 7/00 | 343/702 |
| 2020/0203851 A1 * | 6/2020 | Takaki | H01Q 9/42 | |
| 2021/0050664 A1 * | 2/2021 | Lin | H01Q 3/02 | |
| 2023/0059603 A1 * | 2/2023 | Woo | H01Q 1/48 | |

FOREIGN PATENT DOCUMENTS

| | | | |
|---|---|---|---|
| CN | 111682316 A * | 9/2020 | H01Q 3/02 |
| JP | H07273520 A * | 10/1995 | |

* cited by examiner

*Primary Examiner* — Hoang V Nguyen
*Assistant Examiner* — Brandon Sean Woods
(74) *Attorney, Agent, or Firm* — Philip H. Burrus, IV

(57) ABSTRACT

An antenna assembly for an electronic device includes an array of millimeter-wave (mmWave) antenna elements situated within a carrier pivotably mounted upon a base coupled to a substrate. An actuator can pivot the carrier relative to the base to change a field of view of the array of mmWave antenna elements.

20 Claims, 13 Drawing Sheets

-- PRIOR ART --

PIVOTING MILLIMETER-WAVE ANTENNA ASSEMBLY AND CORRESPONDING ELECTRONIC DEVICES AND METHODS

BACKGROUND

Technical Field

This disclosure relates generally to electronic devices, and more particularly to electronic devices having antennas.

Background Art

Portable electronic communication devices, especially smartphones and tablet computers, have become ubiquitous. People all over the world use such devices to stay connected. Many electronic devices today use millimeter-wave (mmWave) antennas to communicate across a network. While mmWave antennas allow for incredibly fast data throughput rates when working optimally, their performance can degrade under certain conditions. Consequently, some manufacturers build two, three, or four or more mmWave antennas into their devices. In addition to adding cost, this adds system complexity due to the fact that each mmWave antenna requires a non-metallic window occupying valuable area along compact electronic devices such as smartphones. It would be advantageous to have an improved electronic device capable of mitigating such issues arising in conjunction with mmWave antenna array usage.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
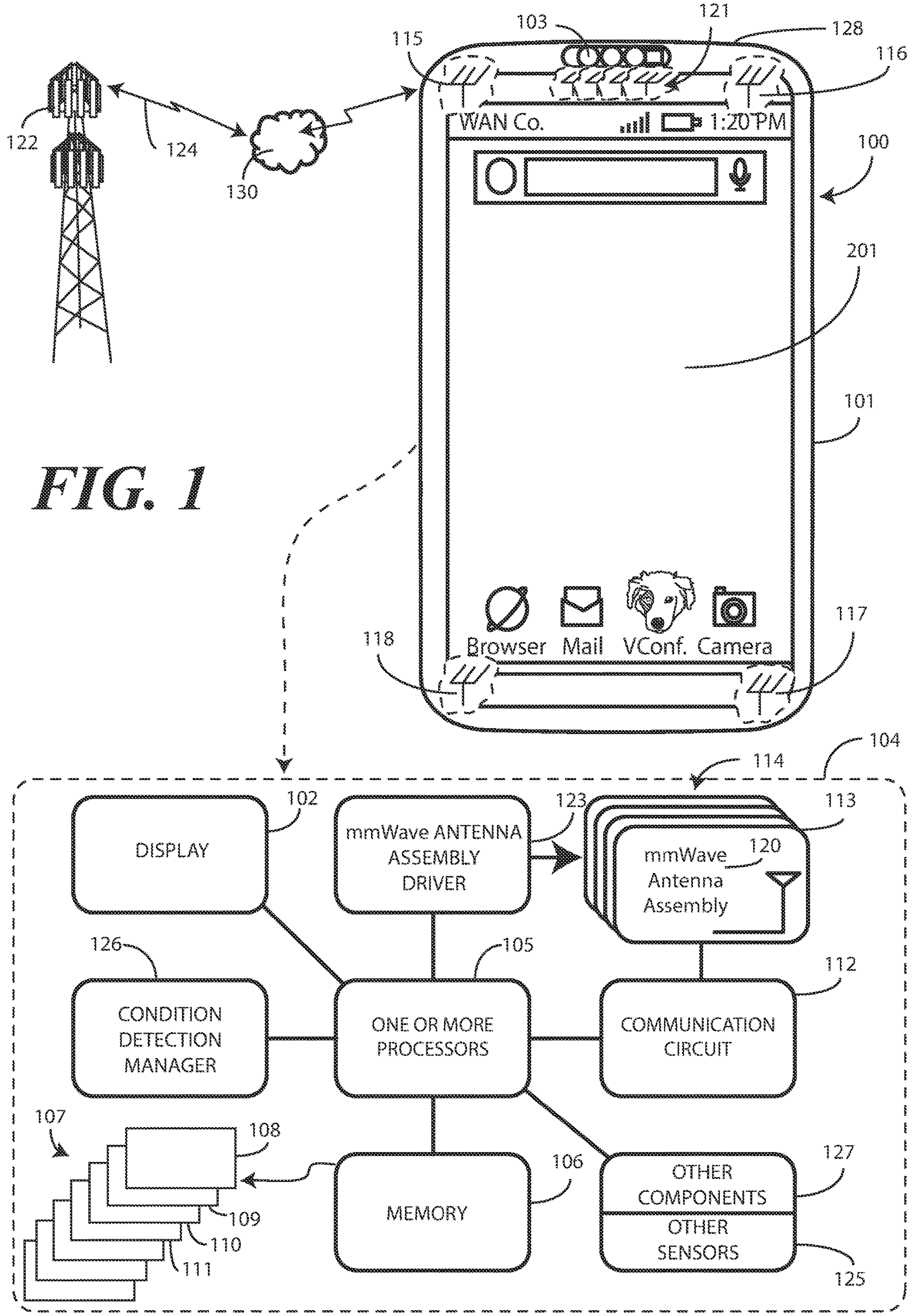
FIG. 1 illustrates on explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to an antenna assembly for an electronic device that includes an array of mmWave antenna elements situated within a carrier that is pivotably mounted upon a base, as well as actuating an actuator to pivot the carrier to change a field of view of the array of mmWave antenna elements. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of pivoting a carrier supporting an array of mmWave antenna elements to change a field of view of the array of mmWave antenna elements as described herein. The non-processor circuits may include, but are not limited to, a radio receiver, a radio transmitter, signal drivers, clock circuits, power source circuits, and user input devices. As such, these functions may be interpreted as steps of a method to perform alteration of a field of view of an array of mmWave antenna elements by pivoting a carrier relative to a substrate to which a base supporting the carrier is coupled.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an antenna assembly for an electronic device that includes an array of mmWave antenna elements situated within a carrier that is pivotably mounted upon a base coupled to a substrate within the electronic device. In one or more embodiments, an actuator pivots the carrier relative to the base to change the field of view of the array of mmWave antenna elements. By pivoting the carrier, a single antenna assembly configured in accordance with the present disclosure can advantageously achieve the signal reception coverage of between two and four prior art antenna modules. Said differently, it would as many as four prior art antenna modules to achieve the same signal reception coverage window that a single antenna assembly configured in accordance with embodiments of the disclosure can provide. This is due to the fact that the actuator can continuously pivot the carrier about an axis from end to end to find an optimal signal reception orientation. Once this orientation is determined, the actuator can cease pivoting the carrier so that the array of mmWave antenna elements can receive signals in this optimal orientation.

In one or more embodiments, a method of controlling the antenna assembly includes pivoting, with an actuator, a carrier carrying an array of mmWave antenna elements relative to a base coupled to a substrate situated inside a housing of an electronic device. One or more processors can determine when a field of view of the array of mmWave antenna elements is optimally oriented toward a best beam of a remote mmWave transmitter, which is also known as a mmWave base station or "gNodeB," with the latter term referring a 5G base station that facilitates the connection of 5G "new radio" or "NR" devices to a 5G network using the NR radio interface. When this occurs, the actuator can cease pivoting. Said differently, the actuator can cease pivoting the carrier once the field of view is oriented toward the best beam of the remote mmWave transmitter.

When conditions change, this process can repeat. For instance, in one or more embodiments one or more sensors can detect a physical change of condition of the electronic device, examples of which include the electronic device being moved, being folded, being placed against a metal surface, being placed against a user's torso or head, being placed in a purse, or simply being turned over in three-dimensional space. When this occurs, the actuator can again pivot the carrier carrying the array of mmWave antenna elements relative to the base until the field of view is again oriented toward the best beam of the remote mmWave transmitter or, alternatively, is oriented toward another best beam of another remote mmWave transmitter.

More particularly, in one or more embodiments the actuator can pivot the carrier carrying the array of mmWave antenna element toward the best beam of a remote mmWave transmitter or, alternatively, toward the best beam of another remote mmWave transmitter. Embodiments of the disclosure contemplate that in some instances there may be only one mmWave transmitter available to service an electronic device. However, this mmWave transmitter may be capable of providing many different beams with which an electronic device can communicate with the base station. Some can be direct "line of sight" beams, while others—which may offer better service—can be reflected or non-direct line of sight beams that are reflected of various structures or objects situated in the environment of the electronic device. Accordingly, in one or more embodiments the actuator pivots not only to find the optimum mmWave transmitter for service, but the optimum beam of that mmWave transmitter as well to get the best reception.

In one or more embodiments, an electronic device includes a device housing. A communication device is situated within the device housing and is operable with an array of mmWave antenna elements electrically coupled to the communication device by a flexible substrate. In one or more embodiments, the array of mmWave antenna elements is situated within a carrier that is pivotable relative to a base. An actuator is then operable to pivot the carrier relative to the base. While generally referred to as an antenna assembly, the mechanical structure carrying the array of mmWave antenna elements, i.e., the carrier, base, and actuator, can be referred to as a "gimbal" because the actuator is operable to pivot the carrier along at least one axis relative to the base. In one or more embodiments, the antenna assembly or gimbal includes multiple actuators operable to pivot the carrier along multiple axes.

One or more processors are then operable with the actuator to cause the actuator to pivot the carrier relative to the base to optimize mmWave signal reception by the array of mmWave antenna elements. The one or more processors can cause the actuator to pivot the carrier to initially orient the array of mmWave antenna elements toward a best beam of a remote mmWave transmitter, such as a tower of a terrestrial cellular network. Alternatively, the one or more processors can cause the actuator to pivot the carrier when one or more sensors detect a change in physical change of the electronic device.

Advantageously, embodiments of the disclosure can be used in all sorts of electronic devices. While a smartphone will be used as one explanatory electronic device for illustration purposes, antenna assemblies configured in accordance with embodiments of the disclosure can be desirable in other electronic devices as well. For example, while very useful in fifth generation technology standard for broadband cellular network (5G) smartphones, antenna assemblies configured in accordance with embodiments of the disclosure could be used in servers to allow the array of mmWave antenna elements to orient optimally toward a best beam of a tower or other mmWave transmitter as a function of the server installation location. Alternatively, embodiments of the disclosure could be incorporated into fixed wireless access (FWA) Internet devices as well. When the server or FWA Internet device is moved, the process can repeat. Advantageously, including a pivotable antenna assembly configured in accordance with embodiments of the disclosure can obviate the need to incorporate three, four, or more prior art antenna modules into an electronic device. Instead, they can be replaced with a single antenna assembly, thereby saving cost and reducing complexity.

In one or more embodiments, the one or more processors can execute a feedback control loop in the following manner: Initially, an actuator can constantly spin the carrier supporting the array of mmWave antenna elements at a predetermined rate to optimize mmWave signal reception by the array of mmWave antenna elements, locking the carrier in a specific position once a good reception (Rx) signal is received. The actuator can cause the carrier to stay in that position until, for example, the signal level drops below a preset threshold. When this occurs, the actuator can again start pivoting the carrier. In conjunction with other sensors, examples of which include an accelerometer, the pivoting motion of carrier can be stopped if the electronic device becomes stationery after reaching the best Rx signal.

For more stationary applications, such as the server application mentioned above, embodiments of the disclosure contemplate that placement of such servers tend to be consistent, with the server being statically placed in a single location. Accordingly, in such applications the actuator can initially pivot the carrier to orient the array of mmWave antenna elements toward a best beam of a particular remote transmitter and then lock the carrier. If the server is ever moved, the process can be repeated, and so forth.

Accordingly, it should be noted that antenna assemblies configured in accordance with embodiments of the disclosure can be used in any electronic device that supports mmWave 5G (or later standard) communications. Advantageously, embodiments of the disclosure not only save cost by reducing antenna assembly part counts, but also improve antenna reception coverage capabilities. Embodiments of the disclosure also improve aesthetics of electronic devices into which they are incorporated by eliminating the number of non-metallic windows required for antenna assemblies. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, laptop computers, desktop computers, servers, networked computers, multimedia players, and so forth. Still other types of electronic devices can be configured in accordance with one or more embodiments of the disclosure as will be readily appreciated by those of ordinary skill in the art having the benefit of this disclosure.

The electronic device 100 includes a device housing 101. In one or more embodiments the device housing 101 is manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single device housing 101. However, in other embodiments two or more device housings can be included.

Figure 19:
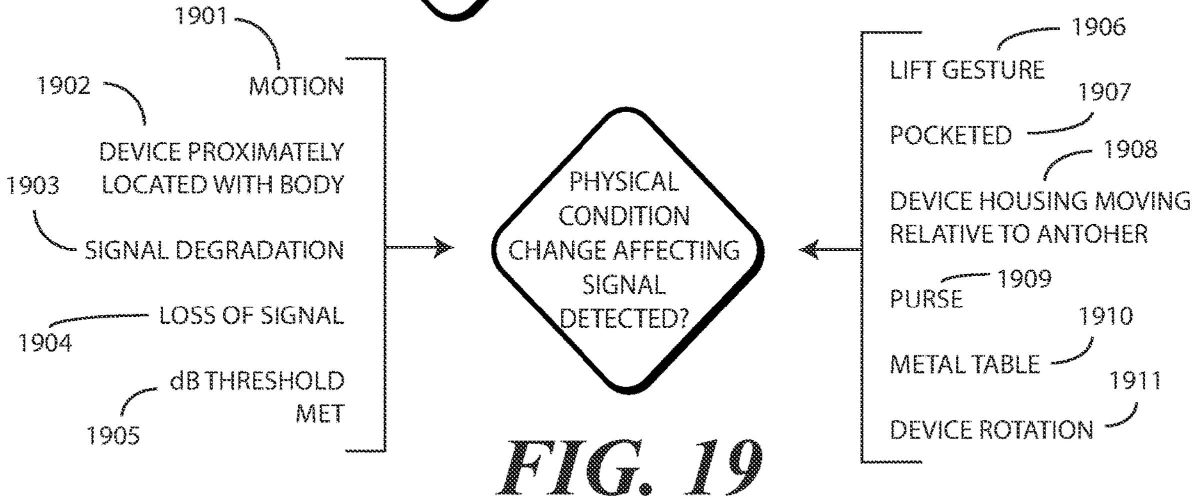
FIG. 19 illustrates various physical conditions that can affect the performance of an antenna assembly pivoted to a particular position in accordance with one or more embodiments of the disclosure.

Illustrating by example, as will be described below with reference to FIG. 19, in other embodiments an electronic device includes a first device housing and a second device housing. In one or more embodiments, a hinge assembly couples the first device housing to the second device housing. In one or more embodiments, the first device housing is selectively pivotable about the hinge assembly relative to the second device housing. For example, in one or more embodiments the first device housing is selectively pivotable about the hinge assembly between a closed position and an axially displaced open position. In still other embodiments, multiple hinges can be incorporated into the electronic device to allow it to be folded in multiple locations.

This illustrative electronic device 100 of FIG. 1 includes a display 102. The display 102 can optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display 102.

In one embodiment, the display 102 is configured as an organic light emitting diode (OLED) display fabricated on a substrate. Where the electronic device is flexible, as shown below in FIG. 19, the substrate can comprise flexible plastic substrate, thereby making the display 102 a flexible display or foldable display that deforms when the first device housing pivots about the hinge assembly relative to the second device housing.

Features can be incorporated into the device housing 101. Examples of such features include an imager 103 or an optional speaker port. A user interface component, which may be a button or touch sensitive surface, can also be disposed along the device housing 101. Other features can be added as well.

A block diagram schematic 104 of the electronic device 100 is also shown in FIG. 1. The block diagram schematic 104 can be configured as a printed circuit board assembly disposed within the device housing 101 of the electronic device 100. Various components can be electrically coupled together by conductors or a bus disposed along one or more printed circuit boards.

It should be noted that the block diagram schematic 104 includes many components that are optional, but which are included in an effort to demonstrate how varied electronic devices configured in accordance with embodiments of the disclosure can be. Thus, it is to be understood that the block diagram schematic 104 of FIG. 1 is provided for illustrative purposes only and for illustrating components of one electronic device 100 in accordance with embodiments of the disclosure. The block diagram schematic 104 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one or more embodiments, the electronic device 100 includes one or more processors 105. The one or more processors 105 can be a microprocessor, a group of processing components, one or more Application Specific Integrated Circuits (ASICs), programmable logic, or other type of processing device. The one or more processors 105 can be operable with the various components of the electronic device 100. The one or more processors 105 can be configured to process and execute executable software code to perform the various functions of the electronic device 100. A storage device, such as memory 106, can optionally store the executable software code used by the one or more processors 105 during operation.

In one or more embodiments, the one or more processors 105 are further responsible for performing the primary functions of the electronic device 100. For example, in one embodiment the one or more processors 105 comprise one or more circuits operable to present presentation information, such as images, text, and video, on the display 102. The executable software code used by the one or more processors 105 can be configured as one or more modules 107 that are operable with the one or more processors 105. Such modules 107 can store instructions, control algorithms, and so forth.

In one embodiment, the one or more processors 105 are responsible for running the operating system environment 108. The operating system environment 108 can include a kernel, one or more drivers 109, and an application service layer 110, and an application layer 111. The operating system environment 108 can be configured as executable code operating on one or more processors or control circuits of the electronic device 100.

In one or more embodiments, the one or more processors 105 are responsible for managing the applications of the electronic device 100. In one or more embodiments, the one or more processors 105 are also responsible for launching, monitoring and killing the various applications and the various application service modules. The applications of the application layer 111 can be configured as clients of the application service layer 110 to communicate with services through application program interfaces (APIs), messages, events, or other inter-process communication interfaces.

In this illustrative embodiment, the electronic device 100 also includes a communication device 112 that can be configured for wired or wireless communication with one or more other devices or networks. The networks can include a wide area network, a local area network, and/or personal area network. The communication device 112 may also utilize wireless technology for communication, such as, but are not limited to, peer-to-peer or ad hoc communications, and other forms of wireless communication such as infrared technology. The communication device 112 can include wireless communication circuitry, one of a receiver, a transmitter, or transceiver, and one or more antennas 113.

The one or more antennas 113 can take a variety of forms. Using 5G communication as an example, the one or more antennas 113 can comprise a MIMO antenna array 114 comprising a plurality of antenna elements 115,116,117,118 configured for MIMO communication with other remote electronic devices, servers, base stations, and so forth, across a network 130. In the illustrative embodiment of FIG. 1, the MIMO antenna array 114 consists of four antenna elements 115,116,117,118. While four antenna elements 115,116,117,118 are shown as defining the MIMO antenna array 114 in FIG. 1, it should be noted that embodiments of the disclosure the electronic device 100 can be equipped with six antenna element, eight antenna element, or higher numbers of antenna elements.

Figure 2:
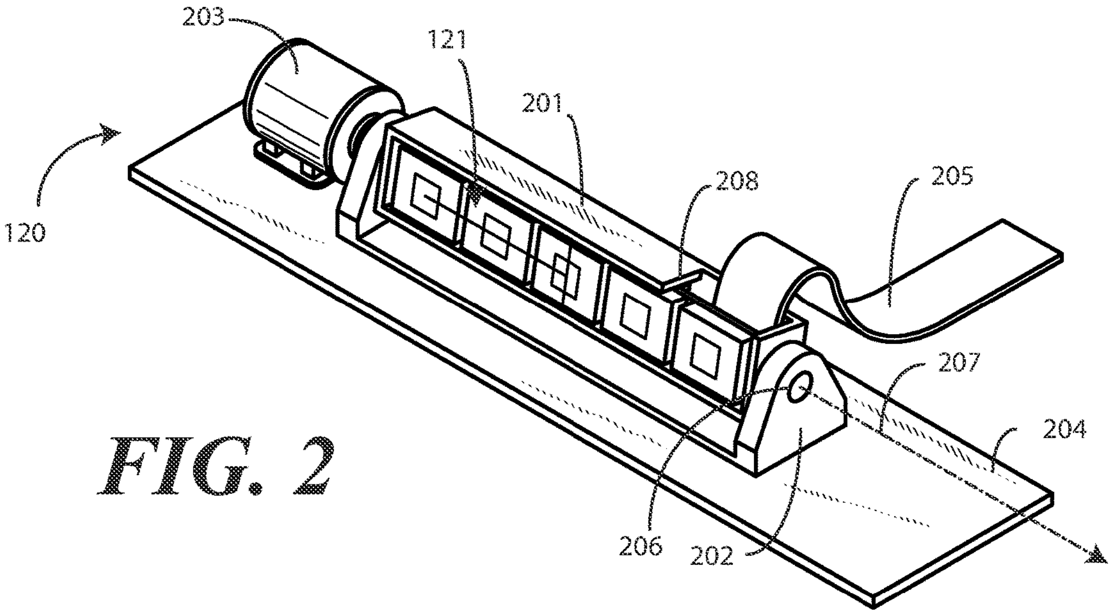
FIG. 2 illustrates one explanatory antenna assembly, pivoted to a first position, in accordance with one or more embodiments of the disclosure.
Figure 3:
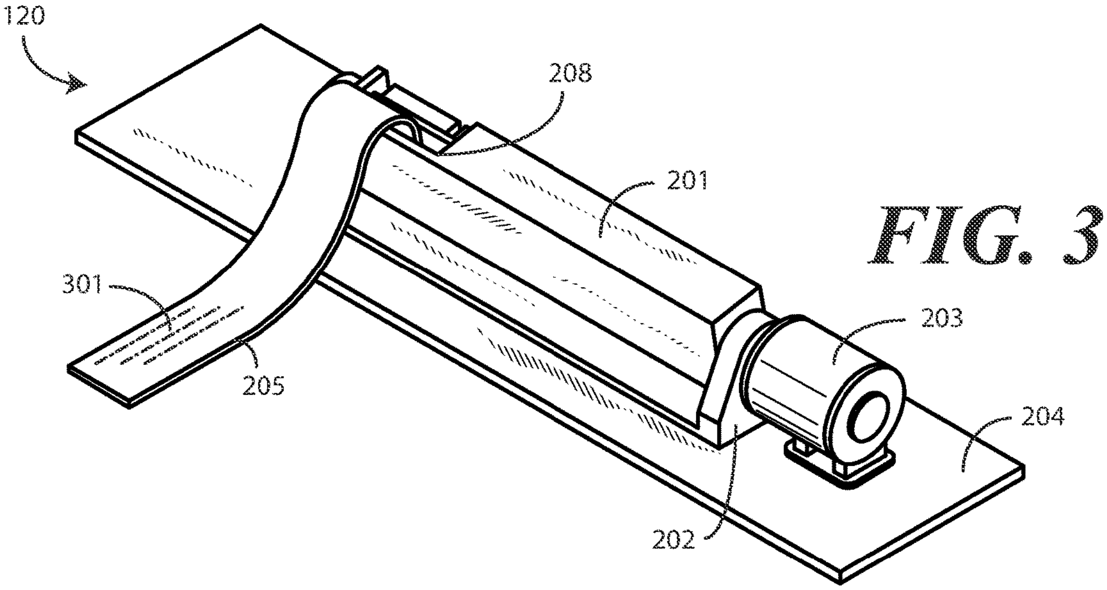
FIG. 3 illustrates another view of the explanatory antenna assembly of FIG. 2.
Figure 4:
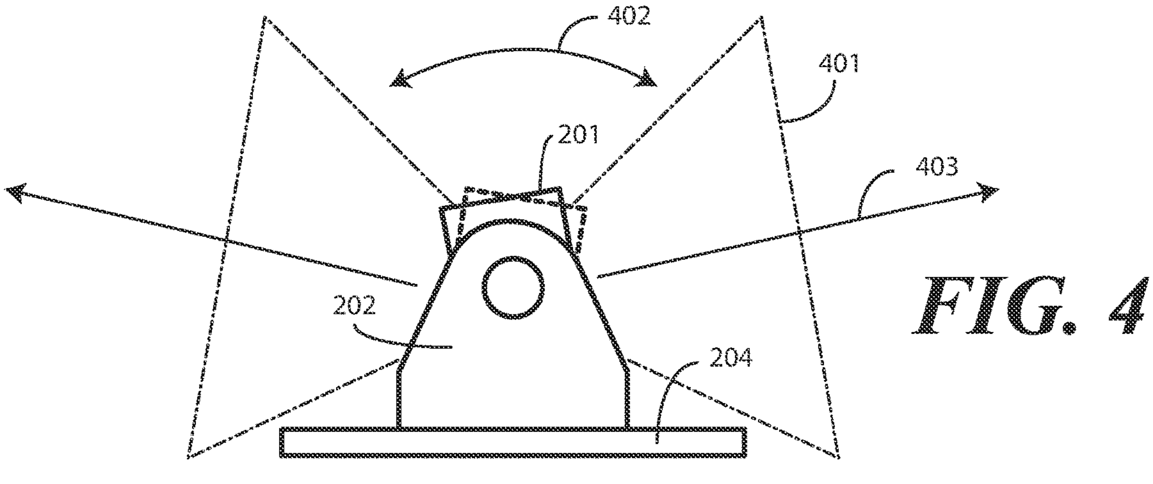
FIG. 4 illustrates a side view of the explanatory antenna assembly of FIG. 2.

In one or more embodiments, the one or more antennas 113 also include at least one mmWave antenna assembly 120. In one or more embodiments, the mmWave antenna assembly 120 comprises an array of mmWave antenna elements 121. One example of such a mmWave antenna assembly 120 is shown in FIGS. 2-4. Other examples of mmWave antenna assemblies configured in accordance with embodiments of the disclosure are shown in FIGS. 13-14, FIG. 15, FIG. 16, and FIG. 17. Still others will be obvious to those of ordinary skill in the art having the benefit of this disclosure.

Turning briefly to FIGS. 2-4, illustrated therein is one explanatory mmWave antenna assembly 120 configured in accordance with one or more embodiments of the disclosure. In one or more embodiments, the mmWave antenna assembly 120 comprises an array of mmWave antenna elements 121 situated within a carrier 201. In one or more embodiments, the carrier is pivotably mounted 206 upon a base 202. In one or more embodiments, the base 202 is coupled to a substrate 204 situated within an electronic device (100).

In one or more embodiments, an actuator 203 is operable to pivot the carrier 201 relative to the base 202 to change 402 a field of view 401 of the array of mmWave antenna elements 121. This allows the actuator 203 to optimize mmWave signal reception by the array of mmWave antenna elements 121 by orienting a central axis 403 of the field of view 401 toward a best beam of a remote mmWave transmitter or transceiver.

In one or more embodiments, a flexible substrate 205 comprising one or more electrical conductors 301 is coupled to the array of mmWave antenna elements 121. Illustrating by example, the one or more electrical conductors 301 of the flexible substrate 205 can couple the array of mmWave antenna elements 121 to a communication device (112) configured for wireless communication with a remote mmWave transceiver, one example of which is the tower (122) of FIG. 1. As shown in FIGS. 2-3, in one or more embodiments the flexible substrate 205 is configured to deform when the actuator 203 pivots the carrier 201 relative to the base 202. This deformation can also be seen illustratively by comparing FIGS. 6, 8, and 10 below.

In one or more embodiments, each of the carrier 201 and the base 202 are manufactured from a non-metallic, rigid material. Illustrating by example, in one or more embodiments the carrier 201 and the base 202 are manufactured from a thermoplastic material. Lubricants can be added at the pivotable mount 206 to facilitate more efficient pivoting between the carrier 201 and the base 202.

In one or more embodiments, the actuator 203 is also coupled to the substrate 204. This configuration allows the actuator 203 to pivot the carrier 201 relative to the substrate when pivoting the carrier relative to the base 202. In other embodiments, the actuator 203 will be coupled to the base 202 rather than the substrate 204. In still other embodiments, the actuator 203 will be integrated into the base 202 at the pivotable mount 206 and will not be externally situated as shown in FIGS. 2-3. Other positions for the actuator 203 will be obvious to those of ordinary skill in the art having the benefit of this disclosure.

The actuator 203 can take different forms. In one or more embodiments, the actuator 203 is a motor. In other embodiments, the actuator 203 comprises a micromotor. In still other embodiments, the actuator 203 comprises a piezoelectric transducer operable to pivot the carrier 201 relative to the base 202 and/or substrate. Other examples of actuators 203 suitable to pivot a carrier 201 into which an array of mmWave antenna elements 121 is situated will be obvious to those of ordinary skill in the art having the benefit of this disclosure.

Figure 13:
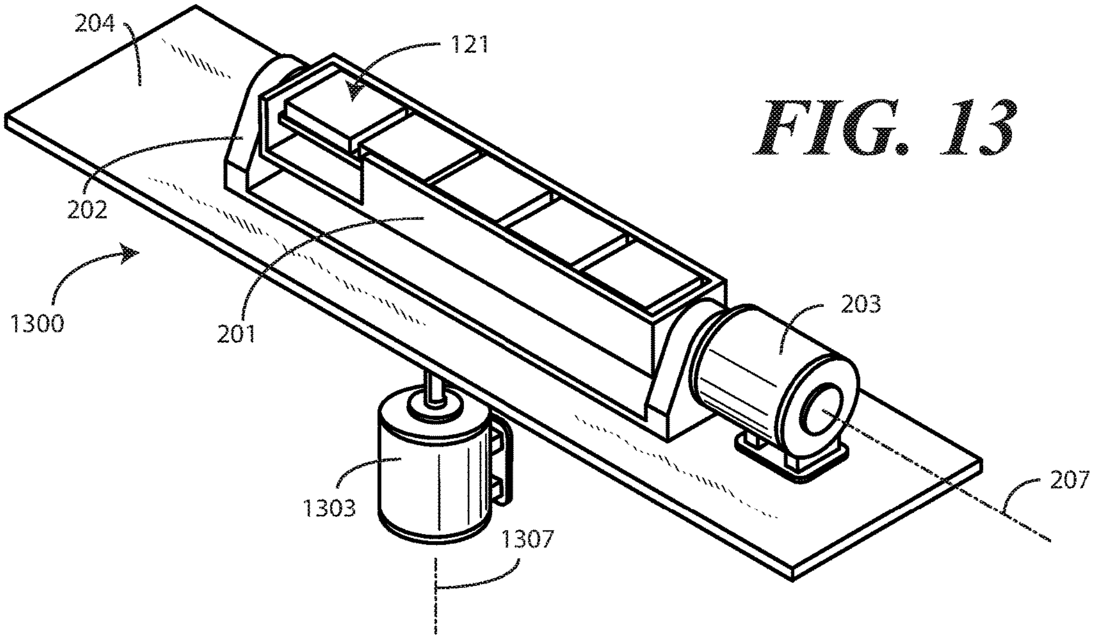
FIG. 13 illustrates an alternate explanatory antenna assembly configured in accordance with one or more embodiments of the disclosure.
Figure 14:
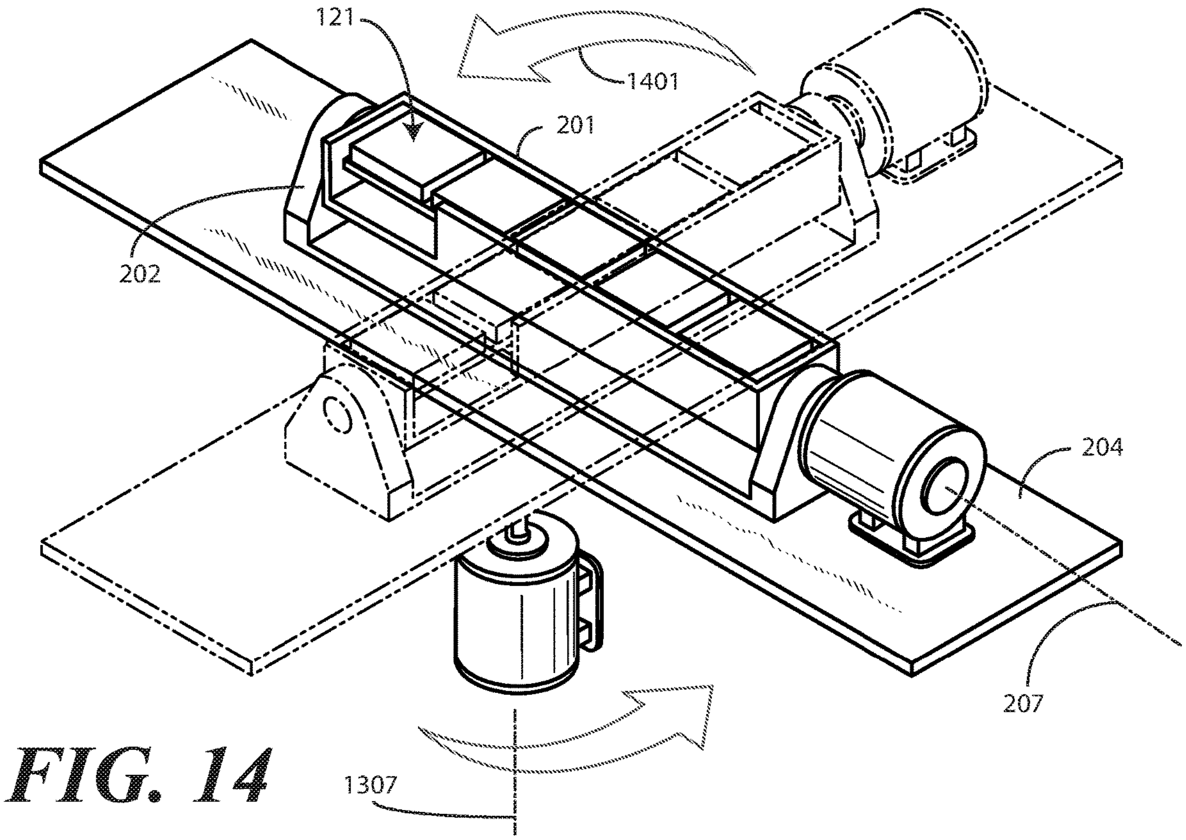
FIG. 14 illustrates the explanatory antenna assembly of FIG. 13 being actuated.

In the illustrative embodiment of FIGS. 2-4, the actuator 203 pivots the carrier 201 relative to the base 202 along a single axis 207. However, embodiments are not so limited. Turning briefly to FIG. 13, illustrated therein is another antenna assembly 1300 that is operable to pivot along two axes, namely, a first axis 207 and a second axis 1307. Specifically, a first actuator 203 pivots the carrier 201 relative to the base 202 (and substrate 204 in this example) around the first axis, while a second actuator 1303 pivots the substrate 204 around the second axis 1307. In the illustrative embodiment of FIG. 13, the first axis 207 is substantially orthogonal to the second axis 1307. As shown in FIG. 14, this allows the substrate 204 to pivot 1401 around the second axis 1307, while the carrier 201 is operable to pivot the array of mmWave antenna elements 121 around the first axis 207.

Figure 25:
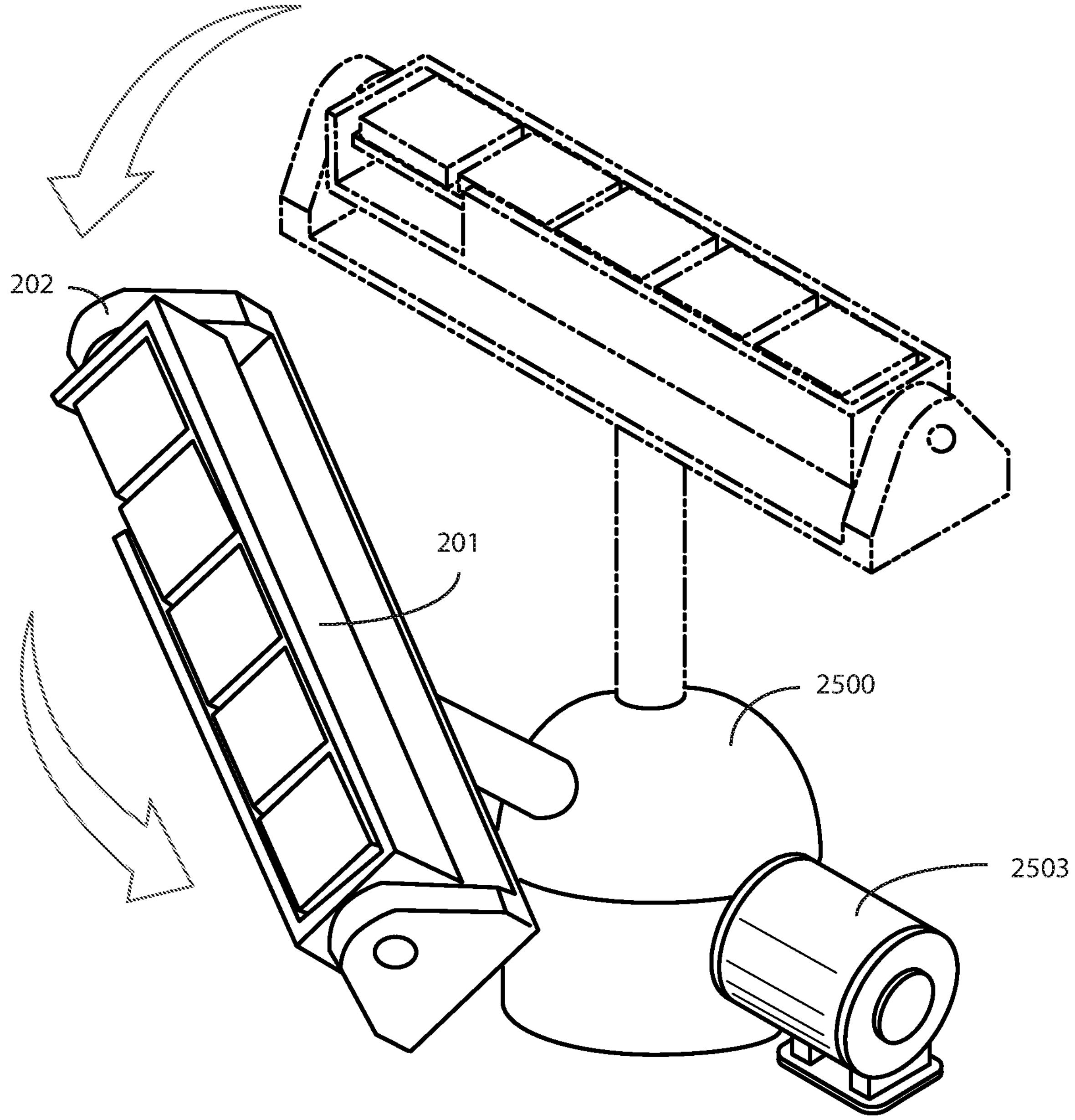
FIG. 25 illustrates an alternate explanatory antenna assembly configured in accordance with one or more embodiments of the disclosure.

As an alternate to FIGS. 13 and 14, in other embodiments only one actuator need be included to pivot the carrier relative to the base along multiple axes. Turning now briefly to FIG. 25, in this illustrative embodiment a single actuator 2503 utilizes a gear box 2500 to pivots the carrier 201 relative to the base 202 along multiple axes. The gear box 2500 allows a single motor to move the carrier 201 relative to the base 202 around multiple axes.

Turning now back to FIGS. 2-3, in one or more embodiments the array of mmWave antenna elements 121 defines a N×1 matrix, where N represents a number of mmWave antenna elements of the array of mmWave antenna elements 121. In the illustrative embodiment of FIG. 1, the N×1 matrix is a 4×1 matrix, as the array of mmWave antenna elements 121 includes four antenna elements arranged side-by-side in a single row. While this is one example of a N×1 matrix that works well for compact electronic devices such as the smartphone of FIG. 1, embodiments of the disclosure are not so limited. Embodiments of the disclosure contemplate that larger devices, such as the server application discussed above can accommodate N×M matrices, where N represents a number of mmWave antenna elements of the array of mmWave antenna elements 121 in a single row, and M represents the number of rows. Thus, other embodiments may include a 4×2 matrix of array of mmWave antenna elements 121, a 4×3 matrix of array of mmWave antenna elements 121, and so forth. Similarly, the number of mmWave antenna elements in each row can be changed as well, which allows for 3×2 matrices, 5×4 matrices, and so forth. The various combinations of mmWave antenna elements and rows will be obvious to those of ordinary skill in the art having the benefit of this disclosure and need not be discussed further in the interest of brevity. Moreover, examples of other matrices will be described below with reference to FIG. 15.

In one or more embodiments, the carrier 201 includes a peninsular aperture 208 that allows the flexible substrate 205 to pass from an exterior of the carrier 201 to an interior of the carrier 201 to allow the one or more electrical conductors 301 to electrically couple the array of mmWave antenna elements 121 to the communication device (112) that utilizes the array of mmWave antenna elements 121 for mmWave communication. The illustrative carrier 201 of FIGS. 2-3 is rectangular in shape, with a dimension along the N direction of the N×1 matrix being longer than another direction along the 1 direction of the N×1 matrix.

Turning now back to FIG. 1, in one or more embodiments a mmWave antenna assembly driver 123 can cause the actuator (203) to pivot the carrier (201) carrying the array of mmWave antenna elements 121 relative to the base (202) coupled to the substrate (204) situated inside the device housing 101 of the electronic device 100. Operating in conjunction with the communication device 112, the one or more processors 105 can determine that the field of view 401 of the array of mmWave antenna elements 121 is oriented toward a best beam of a remote mmWave transmitter, one example of which is the tower 122 shown in FIG. 1. Once the field of view 401 is oriented toward a best beam of the remote mmWave transmitter, the mmWave antenna assembly driver 123 can cause the actuator (203) to cease pivoting the carrier (201) so as to allow the array of mmWave antenna elements 121 to receive mmWave signals 124 across the network 130.

The effectiveness of each antenna element of the array of mmWave antenna elements 121 to engage in mmWave communication across the network 130 can be affected by a variety of factors. Illustrating by example, if the electronic device 100 is rotated in three-dimensional space, the field of view (401) of the array of mmWave antenna elements 121 may become oriented in a direction opposite that of the remote mmWave transmitter. Alternatively, when the electronic device 100 is lifted and placed against the head of a user, even when the field of view (401) of the array of mmWave antenna elements 121 is oriented toward a best beam of a remote mmWave transmitter it may still be desirable to pivot the array of mmWave antenna elements 121 so that the field of view (401) is oriented toward a better beam of another remote mmWave transmitter. This can be desirable to increase operating efficiency, reduce power density (maximum permissible exposure) of mmWave signals (which are typically above six gigahertz), or for other reasons.

Accordingly, in one or more embodiments the electronic device 100 includes one or more sensors 125 operable to detect a physical change of condition of the electronic device 100. A condition detection manager 126 operable with the one or more sensors 125 can cause the actuator (203) to again pivot the carrier (201) carrying the array of mmWave antenna elements 121 relative to the base (202) until the field of view (401) is again oriented toward a best beam of the remote mmWave transmitter or, alternatively, toward a better beam of another remote mmWave transmitter. Examples of such physical changes of condition can include a person becoming proximately situated with the electronic device 100, motion of the electronic device 100 in three-dimensional space, a first device housing pivoting about a hinge relative to a second device housing when the electronic device is configured as a foldable electronic device such as the one shown below in FIG. 20, and so forth.

In one or more embodiments, the physical change of condition causing the condition detection manager 126 to actuate the actuator (203) is detected when the ability of the array of mmWave antenna elements 121 to receive a mmWave signal 124 from the remote mmWave transmitter degrades by an amount greater than a predefined degradation threshold. In one or more embodiments, the predefined degradation threshold is represented in decibels (dB) or decibels relative to one milliwatt (dBm). One example of the predefined degradation threshold is −15 dBm, although others will be obvious to those of ordinary skill in the art having the benefit of this disclosure. Other examples of such "triggering events" causing the condition detection manager 126 to actuate the actuator (203) will be described below with reference to FIGS. 19-23. Still others will be obvious to those of ordinary skill in the art having the benefit of this disclosure.

In one or more embodiments when such a triggering event occurs, the condition detection manager 126 actuates the actuator (203), thereby causing the carrier (201) to pivot and change the field of view (401) of the array of mmWave antenna elements 121. Illustrating by example, the condition detection manager 126 can cause the actuator (203) to pivot the carrier (201) relative to the base (202) to optimize mmWave signal reception by the array of mmWave antenna elements 121 in response to the one or more sensors 125 detecting the physical change of condition of the electronic device.

One or both of the mmWave antenna assembly driver 123 and/or the condition detection manager 126 can be configured as a hardware module operable with the one or more processors 105 in one or more embodiments. In other embodiments, these components are configured as software or firmware operating on the one or more processors 105. In still other embodiments, these components are configured as a hardware components integrated within the one or more processors 105. Other configurations for these components will be obvious to those of ordinary skill in the art having the benefit of this disclosure.

As noted above, one or more sensors 125 can be included to detect triggering events requiring the field of view (401) of the array of mmWave antenna elements 121 to change. These one or more sensors 125 can include one or more proximity sensors that detect objects approaching, or becoming proximately located with, surfaces of the electronic device 100. In other embodiments, the one or more sensors 125 can include an imager. Embodiments of the disclosure contemplate that placement of the electronic device on a metal table or other surface can cause the ability of the array of mmWave antenna elements 121 to receive mmWave signals 124 from a remote mmWave transmitter to degrade by an amount greater than a predefined degradation threshold. Accordingly, an imager can capture images of the table or surface approaching the exterior surfaces of the electronic device 100 to identify such a triggering event.

Figure 20:
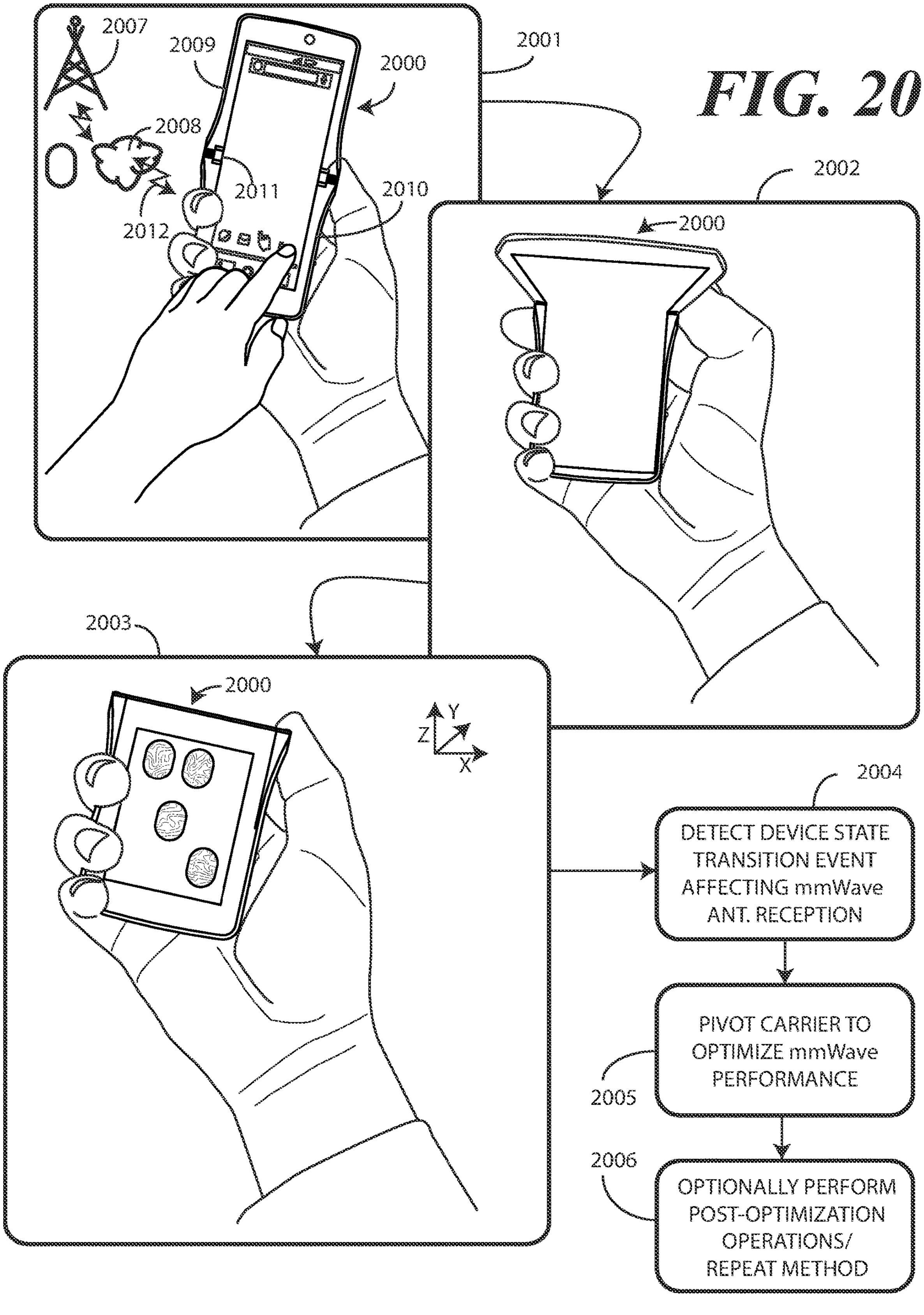
FIG. 20 illustrates another explanatory method in accordance with one or more embodiments of the disclosure.

In one or more embodiments, the imager of the one or more sensors 125 is configured as an intelligent imager. Where configured as an intelligent imager, the imager can capture one or more images of environments about the electronic device 100 to determine whether the object matches predetermined criteria. For example, the imager can operate as an identification module configured with optical recognition such as image recognition, character recognition, visual recognition, facial recognition, color recognition, shape recognition and the like. Advantageously, the imager can use these processes to identify triggering events, whether they are changes in form factor of the electronic device (where bendable such as shown in FIG. 20), the electronic device 100 being placed on a surface, in a pocket, in a purse, or in another environment.

Where the electronic device includes a first device housing that is pivotable about a hinge relative to a second device housing as shown in FIG. 20, the one or more sensors 125 can include one or more form factor sensors configured to detect changes in a physical form factor of the electronic device.

Illustrating by example, in one embodiment, the one or more form factor sensors comprise one or more flex sensors, operable with the one or more processors 105, to detect a bending operation that causes the first device housing to pivot about the hinge assembly relative to the second device housing, thereby transforming the electronic device into a deformed geometry. In one or more embodiments, the one or more flex sensors can detect initiation of the first device housing pivoting, bending, or deforming about the hinge assembly relative to the second device housing. The one or more flex sensors, where included, can take various forms.

In one or more embodiments, one or more flex sensors comprise passive resistive devices manufactured from a material with an impedance that changes when the material is bent, deformed, or flexed. By detecting changes in the impedance as a function of resistance, the one or more processors 105 can use the one or more flex sensors to detect bending or flexing. In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

The one or more form factor sensors can include other devices as well. For instance, a magnet can be placed in the first device housing while a magnetic sensor is placed in the second device housing, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more form factor sensors can comprise an inductive coil placed in the first device housing and a piece of metal placed in the second device housing, or vice versa. When the metal gets closer to, or farther from, the coil, the one or more form factor sensors detect that a bending operation is occurring.

In other embodiments the one or more form factor sensors can comprise an inertial motion unit situated in the first device housing and another inertial motion unit situated in the second device housing. The one or more processors 105 can compare motion sensor readings from each inertial motion unit to detect movement of the first device housing relative to the second device housing, as well as the orientation of the first device housing and the second device housing relative to the direction of gravity. This data can be used to detect a triggering event in the form of a bending operation occurring between the first device housing and the second device housing.

Each inertial motion unit can comprise a combination of one or more accelerometers, one or more gyroscopes, and optionally one or more magnetometers, to determine the orientation, angular velocity, and/or specific force of one or both of the electronic device 100. When included in the electronic device 100, these inertial motion units can be used as orientation sensors to measure movement of the device housing 101 in three-dimensional space. Similarly, the inertial motion units can be used as orientation sensors to measure the motion of the device housing 101 in three-dimensional space. The inertial motion units can be used to make other measurements as well.

Thus, the one or more sensors 125 can include one or more of an accelerometer, gyroscope, and/or inertial motion to determine an orientation of the electronic device 100 in three-dimensional space. This orientation determination can include measurements of azimuth, plumb, tilt, velocity, angular velocity, acceleration, and angular acceleration, of the device housing 101, or where the electronic device is configured as a bendable electronic device, one of the first device housing or the second device housing. When the electronic device is bendable, and when two inertial motion units are included, with one inertial motion unit being situated in the first device housing and another inertial motion unit being situated in the second device housing, each inertial motion unit can determine motion of its respective device housing is occurring. In one or more embodiments, each inertial motion unit delivers these orientation measurements to the one or more processors 105 in the form of orientation determination signals.

In one or more embodiments, the orientation determination signals are delivered to the one or more processors 105, which report the determined orientations to the various modules, components, and applications operating on the electronic device 100, examples of which include the mmWave antenna assembly driver 123 and the condition detection manager 126. In one or more embodiments, the one or more processors 105 can be configured to deliver a composite orientation that is an average or other combination of the orientation of orientation determination signals indicative of a triggering event to these components.

Other components 127 of the electronic device 100 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the display are being actuated. Alternatively, touch sensors disposed along the device housing 101 can be used to determine whether the electronic device 100 is being touched at side edges or major faces of the electronic device 100 by a surface, hands, keys, or other objects. The touch sensors can include surface and/or housing capacitive sensors in one embodiment.

The other components 127 included with the electronic device 100 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user.

In one or more embodiments, the other components 127 include a gravity detector. For example, as one or more accelerometers and/or gyroscopes may be used to show vertical orientation, constant, or a measurement of tilt relative to gravity. The other components 127 operable with the one or more processors 105 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

Thus, as shown and described with reference to FIG. 1, in one or more embodiments an electronic device 100 includes a device housing 101 with a communication device 112 situated within the device housing 101. In one or more embodiments, the communication device 112 is operable with an array of mmWave antenna elements 121 electrically coupled to the communication device 112 by a flexible substrate (205) situated within a carrier (201) that is pivotable relative to a base (202). An actuator (203) is the operable to pivot the carrier (201) relative to the base (202). One or more processors 105, operable with the actuator (203), can then cause the actuator (203) to pivot the carrier (201) relative to the base (202) to optimize mmWave signal reception by the array of mmWave antenna elements 121.

The one or more sensors 125 and/or the one or more other components 127 can then detect changes in the physical change of condition of the electronic device 100. In one or more embodiments, the one or more processors 105 cause the actuator (203) to pivot the carrier (201) relative to the base (20) in response to the one or more sensors 125 and/or the one or more other components 127 detecting the change in physical condition of the electronic device 100. When the mmWave antenna assembly 120 of FIGS. 2-4 is used in the electronic device 100, the carrier (201) can be situated at an end 128 of the device housing 101, with the array of mmWave antenna elements 121 defining a N×1 matrix where N represents a number of mmWave antenna elements of the array of mmWave antenna elements 121.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 5:
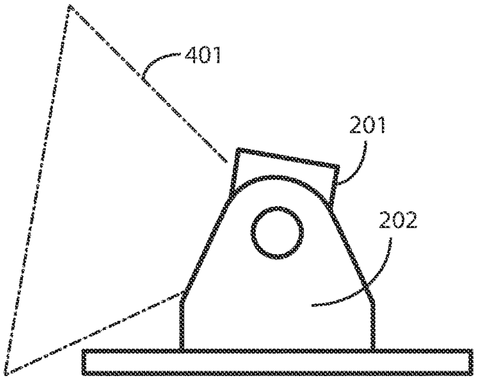
FIG. 5 illustrates still another view of the explanatory antenna assembly of FIG. 2, pivoted to a first position.
Figure 6:
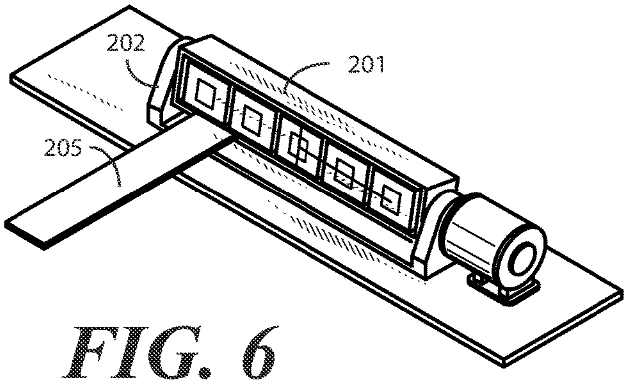
FIG. 6 illustrates another view of the explanatory antenna assembly of FIG. 5.
Figure 7:
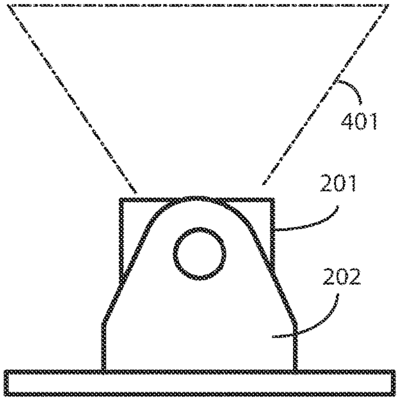
FIG. 7 illustrates another view of the explanatory antenna assembly of FIG. 2, pivoted to a second position.
Figure 8:
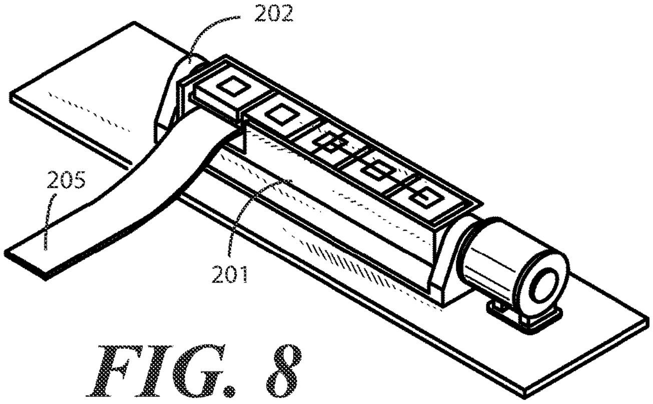
FIG. 8 illustrates another view of the explanatory antenna assembly of FIG. 7.
Figure 9:
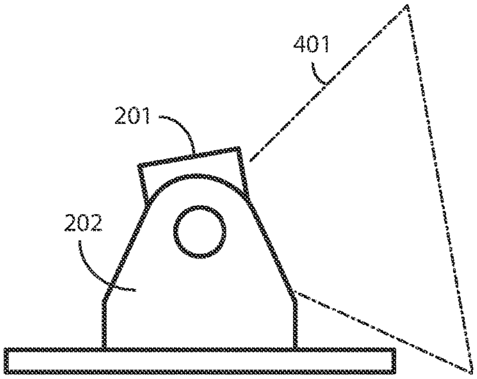
FIG. 9 illustrates another view of the explanatory antenna assembly of FIG. 2, pivoted to a third position.

Turning now to FIGS. 5-10, illustrated therein are examples of positions to which the carrier 201 can be pivoted within the electronic device (100) of FIG. 1. FIGS. 5, 7, and 9 illustrated side elevation views of the perspective vies shown in FIGS. 6, 8, and 10, respectively.

A comparison of FIGS. 5-10 demonstrates that the carrier 201 is pivotable relative to the base 202 within an angle of rotation spanning more than ninety degrees. Illustrating by example, in FIGS. 5-6 the carrier 201 is pivoted to the left to a first position. FIGS. 7-8 then show the carrier 201 pivoted relative to the base 202 to a second position, which is nearly ninety degrees out of phase relative to the position of FIGS. 5-6.

Figure 10:
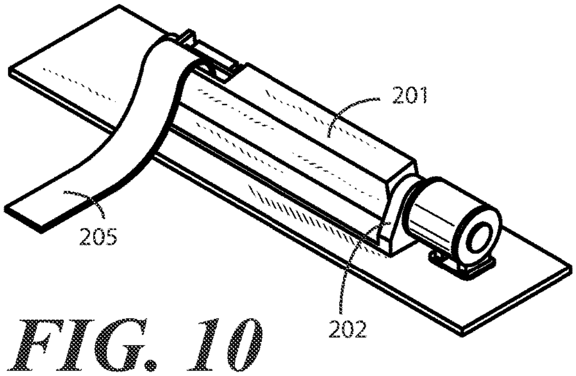
FIG. 10 illustrates another view of the explanatory antenna assembly of FIG. 9.
Figure 11:
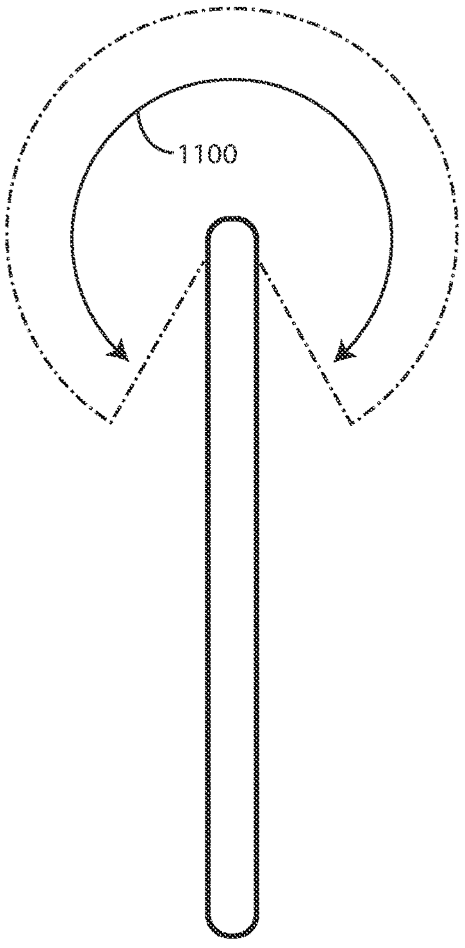
FIG. 11 illustrates another view of the explanatory electronic device of FIG. 1.
Figure 12:
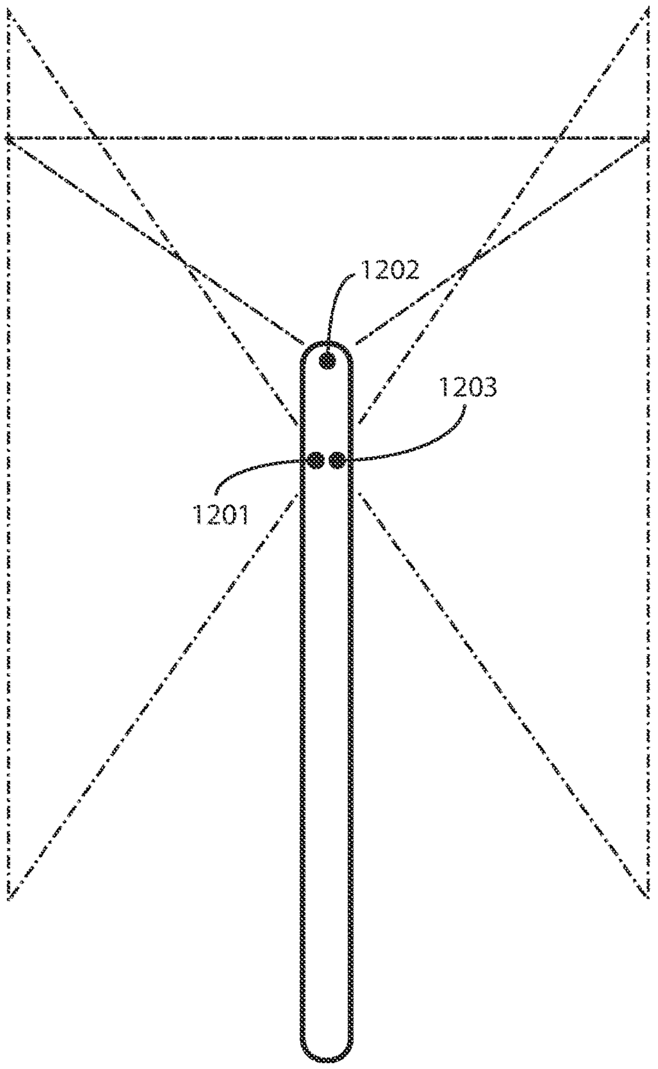
FIG. 12 illustrates a prior art electronic device.

FIGS. 9-10 then show the carrier 201 pivoted relative to the base 202 to a third position which is, again, almost ninety degrees out of phase relative to the second position of FIGS. 7-8. By adding these angles together, it can be seen that the carrier 201 is pivotable relative to the base 202 within an angle of rotation spanning more than ninety degrees. What's more, the first position of FIGS. 5-6 and the third position of FIGS. 9-10 are illustrative, and do not reflect the limits to which the carrier 201 can be pivoted relative to the base 202. When the carrier of FIGS. 5-10 is pivoted between its limits, the field of view 401 of the array of mmWave antenna elements 121 can be pivoted across an angle 1100 of nearly two hundred and seventy degrees, as shown in FIG. 11. This allows the single mmWave antenna assembly 120 of FIGS. 5-10 to replace the three prior art antenna modules 1201, 1202,1203 shown in FIG. 12 without diminishing the span angle associated with the field of view 401.

Another feature that can be seen by comparing FIGS. 6, 8, and 10 is the deflection of the flexible substrate 205. In FIG. 6, the flexible substrate 205 is substantially straight. By contrast, the flexible substrate 205 begins to deform in FIG. 8 as the carrier 201 pivots relative to the base 202. In FIG. 10, due to the slack included in the flexible substrate 205, the flexible substrate 205 defines a partial service loop as the carrier 201 pivots to a direction nearly opposite that shown in FIG. 6.

Figure 15:
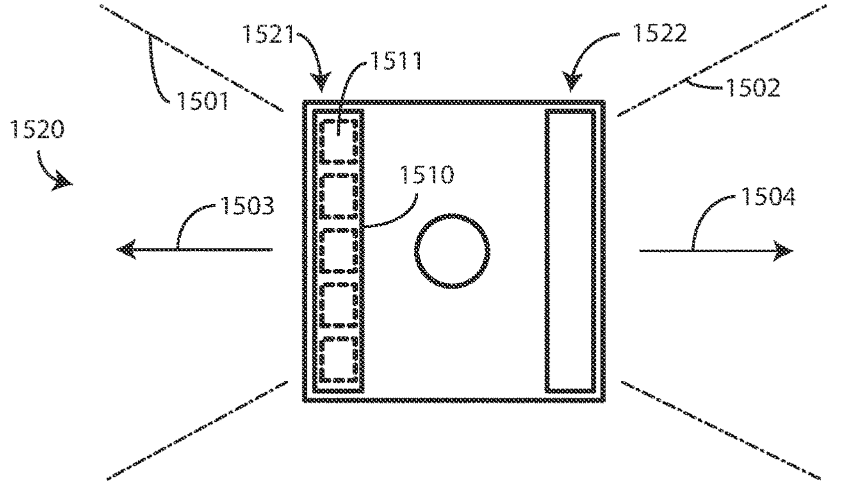
FIG. 15 illustrates another alternate explanatory antenna assembly configured in accordance with one or more embodiments of the disclosure.
Figure 16:
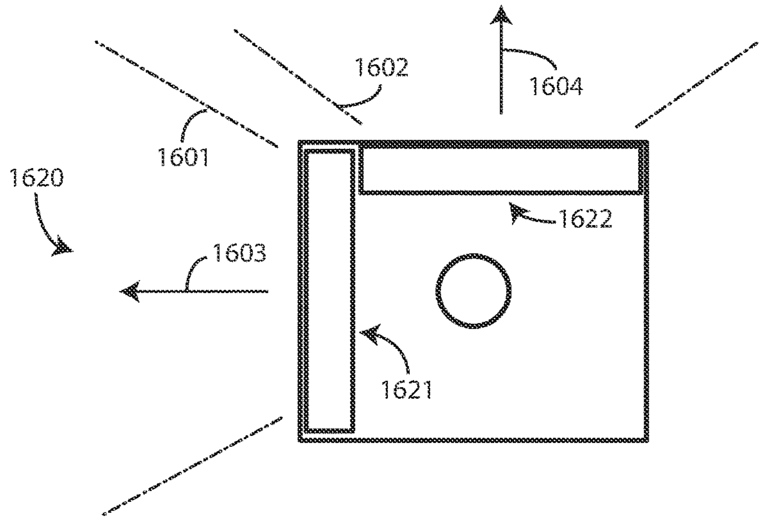
FIG. 16 illustrates still another alternate explanatory antenna assembly configured in accordance with one or more embodiments of the disclosure.
Figure 17:
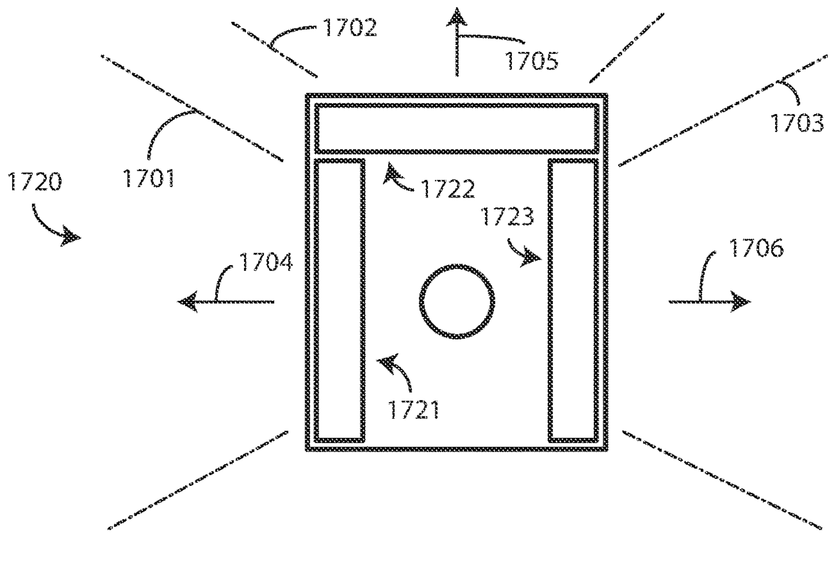
FIG. 17 illustrates yet another alternate explanatory antenna assembly configured in accordance with one or more embodiments of the disclosure.

Turning now to FIGS. 15-17, illustrated therein are alternate mmWave antenna assemblies configured in accordance with embodiments of the disclosure. Recall from above that in the mmWave antenna assembly (120) of FIG. 1, the array of mmWave antenna elements (121) defined a N×1 matrix where N represents a number of mmWave antenna elements of the array of mmWave antenna elements (121). In the illustrative embodiment of FIG. 1, the N×1 matrix was a 4×1 matrix, as the array of mmWave antenna elements (121) included four antenna elements arranged side-by-side in a single row.

While this is one example of a N×1 matrix that works well for compact electronic devices such as the smartphone of FIG. 1, embodiments of the disclosure are not so limited. Embodiments of the disclosure contemplate that larger devices, such as the server application discussed above can accommodate N×M matrices, where N represents a number of mmWave antenna elements of the array of mmWave antenna elements in a single row, and M represents the number of rows. Thus, other embodiments may include a 4×2 matrix of array of mmWave antenna elements, a 4×3 matrix of array of mmWave antenna elements, and so forth.

Each of FIGS. 15-17 illustrates a mmWave antenna assembly 1520,1620,1720 shown in a side elevation view with an end of the array of mmWave antenna elements 1521,1621,1721 shown for visibility. FIG. 15 illustrates two options for the array of mmWave antenna elements 1521 on the left side of the mmWave antenna assembly 1520. In a first example 1510, there is a single row of array of mmWave antenna elements. If three mmWave antenna elements are set side-by-side in this example 1510, the array of mmWave antenna elements would define a 3×1 matrix. However, in a second example 1511, the array of mmWave antenna elements define five different rows. Again, if three mmWave antenna elements are set side by side in each row, the array of mmWave antenna elements would define a 3×5 matrix in this example 1511. Similarly, the number of mmWave antenna elements in each row can be changed as well, which allows for 3×2 matrices, 5×4 matrices, and so forth.

This illustration is included as an example (1) just to show how the matrices defined by the array of mmWave antenna elements 1521 can vary and (2) to prevent any issues from arising under 37 CFR § 1.83(a), which purports to require drawings to show claimed elements despite the fact that 35 USC § 113, from which rule 1.83 is based, clearly states that drawings are optional and are only required "where necessary for the understanding of the subject matter sought to be patented." This is confirmed by MPEP § 608.02(d), which outlines the necessity of drawing figures when it is the only possible way to clearly understand a disclosed invention. Since the matrices defined by the array of mmWave antenna elements are easy to understand given the benefit of this disclosure and the thorough description provided above, these illustrations are optional, yet are provided for completeness. The various combinations of mmWave antenna elements and rows will be obvious to those of ordinary skill in the art having the benefit of this disclosure and need not be discussed further in the interest of brevity.

The mmWave antenna assemblies 1520,1620,1720 differ from the mmWave antenna assembly (120) of FIG. 1 in another way as well. While the mmWave antenna assembly (120) of FIG. 1 included only a single matrix of mmWave antenna elements, the mmWave antenna assemblies 1520, 1620,1720 of FIGS. 15-17 include at least two, or a plurality, of matrices of mmWave antenna elements.

Beginning with FIG. 15, this mmWave antenna assembly 1520 includes two matrices of mmWave antenna elements. Specifically, in the mmWave antenna assembly 1520 of FIG. 15, the array of mmWave antenna elements comprises a first mmWave antenna assembly 1520 having a first field of view 1501 and a second array of mmWave antenna elements 1522 having a second field of view 1502. In the illustrative embodiment of FIG. 15, the central axes 1503,1504 of the first field of view 1501 and the second field of view 1502 are directed in opposite directions. Said differently, in FIG. 15 the first field of view 1501 is directed in an opposite direction of that of the second field of view 1502. Using two array of mmWave antenna elements 1521,1522 allows for a greater sweep of each field of view 1501,1502 with less pivoting of the carrier.

Turning now to FIG. 16, this mmWave antenna assembly 1620 also includes two matrices. Specifically, a first array of mmWave antenna elements 1621 defines a first matrix having a first field of view 1601 while a second array of mmWave antenna elements 1622 defines a second matrix having a second field of view 1602. In this embodiment, central axes 1603,1604 of each field of view 1601,1602 are substantially orthogonal. This arrangement of the arrays of mmWave antenna elements 1621,1622 allows the mmWave antenna assembly 1620 to have a permanent, combined field of view that is greater than 90 degrees. Configuring the arrays of mmWave antenna elements 1621,1622 in this manner can reduce the amount if pivoting the carrier needs to do since mmWave signals can be received from a wider variety of directions. Moreover, a given sweep angle, e.g., 270, 285, 290, or 295 degrees, can be swept with less pivoting of the carrier.

Turning now to FIG. 17, this mmWave antenna assembly 1720 includes three matrices. Specifically, a first array of mmWave antenna elements 1721 defines a first matrix having a first field of view 1701, a second array of mmWave antenna elements 1722 defines a second matrix having a second field of view 1702, and a third array of mmWave antenna elements 1723 defines a third field of view 1703. In this embodiment, central axes 1704,1705,1706 of each field of view 1701,1702,1703 are each substantially orthogonal with at least one other field of view. Said differently, in this illustrative embodiment the first array of mmWave antenna elements defines a first N×1 matrix having a first field of view 1701, a second N×1 matrix having a second field of view 1702, and a third N×1 matrix having a third field of view 1703. In this example, the second field of view 1702 is oriented substantially orthogonally relative to the first field of view 1701 and the second field of view 1703.

This arrangement of the arrays of mmWave antenna elements 1721,1722,1723 allows the mmWave antenna assembly 1720 to have a permanent, combined field of view that is greater than 180 degrees. Configuring the arrays of mmWave antenna elements 1721,1722,1723 in this manner can reduce the amount if pivoting the carrier needs to do since mmWave signals can be received from a wider variety of directions. Moreover, a given sweep angle can be swept with less pivoting of the carrier.

Recall from above that once an actuator of a mmWave antenna assembly configured in accordance with embodiments of the disclosure pivots a carrier relative to a base to optimize mmWave signal reception by an array of mmWave antenna elements situated within the carrier that this pivoting can cease, thereby locking the array of mmWave antenna elements in a physical orientation optimal to receive the mmWave signals. However, the performance of the mmWave antenna assembly can degrade under certain conditions. Simple movement of the electronic device, for example, can cause the array of mmWave antenna elements to become mis-aligned with the direction from which optimal mmWave signals can be received. When this occurs, the network in communication with the electronic device may reduce data block sizes being transmitted to the electronic device. This reduction in block size can cause throughput to decrease and latency to increase.

When the degradation of a mmWave antenna array occurs, the decreased throughput and increased latency can occur in both the downlink and uplink directions. In a degraded state the communication device of the electronic device and the associated components operating the mmWave antenna array can begin to draw increased current, which leads to decreased run time and a diminished overall user experience. The increased current drain results from the communication device and associated components struggling to operate antenna elements that are actually inefficient due to a triggering event occurring in the form of a physical change of condition of the electronic device that degrades the ability of the mmWave antenna assembly to receive mmWave signals from a remote mmWave transmitter by an amount greater than a predefined threshold.

Embodiments of the disclosure provide a solution to these and other situations by providing a pivotable mmWave antenna assembly combined with performance optimization methods and systems that adjust the physical orientation of the carrier carrying the array of mmWave antenna elements and the base to which the carrier is attached. One or more processors can cause this "re-optimization" to occur in response to a triggering event such as the device being moved, changing its physical geometry, being placed on a table, or being placed in a purse.

Figure 18:
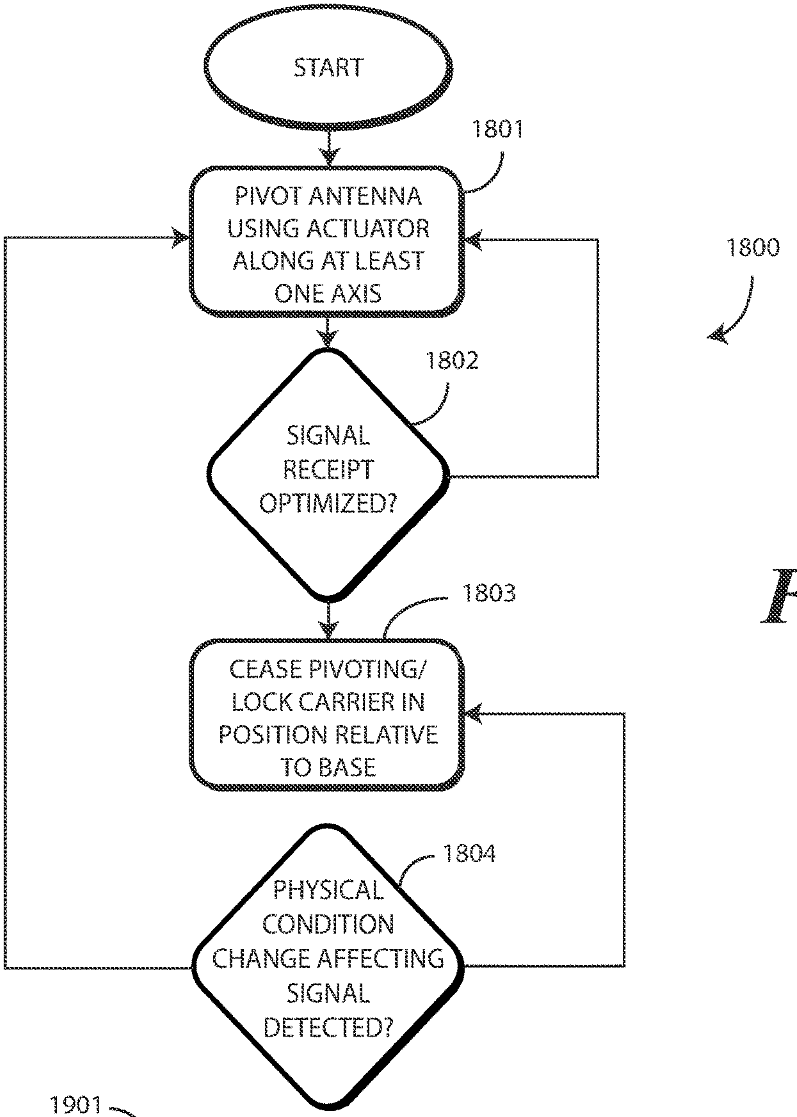
FIG. 18 illustrates one explanatory method in accordance with one or more embodiments of the disclosure.

In one or more embodiments, an electronic device includes a mmWave antenna array comprising a plurality of antenna elements configured for mmWave communication across a network. In one or more embodiments, the electronic device also includes one or more sensors detecting a triggering event degrading an ability of the mmWave antenna assembly to receive a mmWave signal from a remote mmWave transmitter by an amount greater than a predefined degradation threshold. In one or more embodiments, the electronic device includes one or more processors that then control an actuator coupled to a carrier that is pivotably coupled to a base, in response to the one or more sensors detecting the triggering event, to pivot an array of mmWave antenna elements carried by the carrier from a first physical orientation to a second, axially displaced orientation. Turning now to FIG. 18, illustrated therein is one explanatory, and general, method 1800 illustrating how this can occur.

Beginning at step 1801, the method 1800 includes pivoting, with an actuator, a carrier carrying an array of mmWave antenna elements relative to a base. In one or more embodiments, the base is coupled to a substrate. In one or more embodiments, the substrate is situated inside a housing of an electronic device.

At decision 1802, one or more processors determine whether a field of view of the array of mmWave antenna elements is oriented toward a best beam of a remote mmWave transmitter such that the ability to receive mmWave signals is optimized or, alternatively, has a quality score exceeding a predefined mmWave signal reception quality score threshold. Once this occurs, step 1803 comprises ceasing, with the actuator, the pivoting of the carrier. In one or more embodiments, step 1803 occurs when the field of view of the array of mmWave antenna elements carried by the carrier is oriented toward the best beam of the remote mmWave transmitter.

At decision 1804, one or more sensors of the electronic device detect a physical change of condition of the electronic device. When this occurs, the method 1800 returns to step 1801 where the actuator again pivots, in response to the one or more sensors detecting the physical change of condition, the carrier carrying the array of mmWave antenna elements relative to the base to change the field of view. In one or more embodiments, this additional pivoting occurring at step 1801 continues until the field of view is again oriented toward a best beam of the original remote mmWave transmitter or, alternatively, if a better beam is available from another remote mmWave transmitter, until the field of view is oriented toward the better beam from the other remote mmWave transmitter.

Advantageously, the method 1800 of FIG. 18 provides an electronic device with one or more processors that dynamically monitor the performance of the mmWave antenna assembly. Based upon certain triggering events, the method 1800 again pivots a carrier to optimize mmWave signal reception by the array of mmWave antenna elements situated within the carrier in response to the triggering event occurring. This dynamic evaluation of the performance of the mmWave antenna assembly can occur in both uplink and downlink directions.

The method 1800 of FIG. 18 advantageously provides techniques for intelligently adapting antenna element use for mmWave communication and can function with only a single mmWave antenna assembly due to the fact that the carrier is able to pivot relative to the base as a function of dynamically evaluated conditions and performance.

The physical change of condition detected at decision 1804 can take a number of different forms. Turning now to FIG. 19, illustrated therein are a few examples.

A first example of a triggering event 1901 comprises motion of the electronic device. When the electronic device is moved, the previously optimized array of mmWave antenna elements carried by the carrier can become misaligned with the remote mmWave transmitter with which they were aligned prior to the motion. Accordingly, in one or more embodiments when motion of the electronic device is detected, the actuator again pivots—in response to the motion being detected by one or more sensors of the electronic device—the carrier carrying the array of mmWave antenna elements relative to the base until the corresponding field of view is again oriented toward an optimum beam of the remote mmWave transmitter or, alternatively, is oriented toward a more optimum beam from another remote mmWave transmitter.

A second triggering event 1902 comprises a person becoming proximately situated with the electronic device. Said differently, in one or more embodiments a second triggering event is the electronic device becoming proximately located with a body. Embodiments of the disclosure contemplate that when an electronic device, such as a smartphone, is placed near a head or other body portion, it can be advantageous to engage in mmWave communication in a direction away from the body rather than trying to go around or through it. Consequently, if a central axis of a field of view of the array of mmWave antenna elements being carried by the carrier was originally oriented through a front major face of the electronic device, when the second triggering event 1902 is detected, it may be preferable to pivot the carrier carrying the array of mmWave antenna elements so that the central axis of the field of view is oriented through a rear major face of the electronic device.

Accordingly, in one or more embodiments when a person—or portion of a person—becomes proximately situated with the electronic device, the actuator again pivots the carrier carrying the array of mmWave antenna elements relative to the base until the corresponding field of view is again oriented toward a best beam of the remote mmWave transmitter or, alternatively, is oriented toward a best beam of another remote mmWave transmitter.

A third triggering event 1903 occurs when the ability of the array of mmWave antenna elements to receive a mmWave signal from the remote mmWave transmitter degrades. In one or more embodiments, when such a degradation occurs, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

A fourth triggering event 1904 occurs when there is a loss of the mmWave signal. In one or more embodiments when signal loss occurs, the actuator again pivots the carrier carrying the array of mmWave antenna elements relative to the base until the corresponding field of view is again oriented toward best beam of the remote mmWave transmitter or, alternatively, is oriented toward the best beam of another remote mmWave transmitter.

A fifth triggering event 1905 occurs when the ability of the array of mmWave antenna elements to receive a mmWave signal from the remote mmWave transmitter degrades by an amount greater than a predefined degradation threshold. In one or more embodiments, the predefined degradation threshold is represented in decibels (dB) or decibels relative to one milliwatt (dBm). One example of the predefined degradation threshold is −15 dBm, although others will be obvious to those of ordinary skill in the art having the benefit of this disclosure. In one or more embodiments, when such a degradation occurs, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

A sixth triggering event 1906 comprises the detection of a lift gesture. Illustrating by example, if a person lifts the electronic device from their waist to their chest, or from their waist to their ear, the previously optimized array of mmWave antenna elements carried by the carrier can become misaligned with the remote mmWave transmitter with which they were aligned prior to the motion. Accordingly, in one or more embodiments when motion of the electronic device is detected, the actuator again pivots—in response to the lift gesture being detected by one or more sensors of the electronic device—the carrier carrying the array of mmWave antenna elements relative to the base until the corresponding field of view is again oriented toward the best beam of the remote mmWave transmitter or, alternatively, is oriented toward the best beam of another remote mmWave transmitter.

A seventh triggering event 1907 comprises the electronic device being placed in a pocket. In one or more embodiments when such an in-pocket condition is detected, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

An eighth triggering event 1908 is a change in form factor experienced by an electronic device. Illustrating by example, this triggering event 1908 can occur in a hinged device (one example of which is shown in FIG. 20) having a first device housing coupled to a second device housing by a hinge such that the first device housing and the second device housing can pivot between a closed position and an axially displaced open position. In one or more embodiments, any time the first device housing pivots about the hinge assembly relative to the second device housing between an axially displaced open position and a closed position, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

This triggering event 1908 can occur in other ways as well. Illustrating by example, in situations where an electronic device includes a single device housing that is deformable, this triggering event 1908 can occur when a portion of a device housing deforms, thereby changing the spatial relationship between a first device housing portion and a second device housing portion. This triggering event 1908 can also occur in a sliding electronic device when a first device housing slides relative to a second device housing. Other examples of a triggering event 1908 changing a form factor of an electronic device will be obvious to those of ordinary skill in the art having the benefit of this disclosure.

A ninth triggering event 1909 comprises the electronic device being placed in a purse or other container. In one or more embodiments when such an in-container condition is detected, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

A tenth triggering event 1910 comprises the placement of an electronic device against a surface or other object. Illustrating by example, placement of an electronic device on a metal table or other surface can greatly change the performance of a mmWave antenna array. Similarly, placement of an electronic device in a pocket or purse where the electronic device is adjacent to keys and other metal objects can change the performance as well. In one or more embodiments when such an surface-abutment condition is detected, the actuator again pivots the carrier carrying the array of mmWave antenna elements relative to the base until the corresponding field of view is again oriented toward the best beam of the remote mmWave transmitter or, alternatively, is oriented toward the best beam of another remote mmWave transmitter.

An eleventh triggering event 1911 comprises rotation of the electronic device in three-dimensional space. When the electronic device is rotated, the previously optimized array of mmWave antenna elements carried by the carrier can become misaligned with the remote mmWave transmitter with which they were aligned prior to the motion. Accordingly, in one or more embodiments when motion of the electronic device is detected, the actuator again pivots—in response to the rotation being detected by one or more sensors of the electronic device—the carrier carrying the array of mmWave antenna elements relative to the base until the corresponding field of view is again oriented toward the best beam of the remote mmWave transmitter or, alternatively, is oriented toward the best beam of another remote mmWave transmitter.

Triggering events can take other forms as well, examples of which include miscellaneous actions that can alter the performance of the antenna elements of a mmWave antenna array. Illustrating by example, placing an electronic device inside a drawer or in a cabinet might constitute one such triggering event. Similarly, placing an electronic device near magnets or other electromagnetic elements may constitute such a triggering event. Other examples of such miscellaneous triggering events will be obvious to those of ordinary skill in the art having the benefit of this disclosure.

Embodiments of the disclosure are particularly beneficial for deformable electronic devices such as those having a bendable device housing, or a first device housing joined to a second device housing by a hinge such that the first device housing is pivotable about the hinge relative to the second device housing between an axially displaced open position and a closed position. Turning now to FIG. 20, illustrated therein are one or more method steps illustrating how the components of such electronic device can be used to perform dynamic mmWave antenna assembly (120) performance optimization based upon changes in device form factor.

Beginning at step 2001, a communication device (112) of an electronic device 2000 is in communication with a terrestrial cellular tower 2007 operated by a network service provider operating a communication network 2008. The electronic device 2000 can include many of the components described above with reference to FIG. 1, as evidenced by the common reference designators presented below.

As shown, the electronic device 2000 includes a first device housing 2009 coupled to a second device housing 2010 by a hinge 2011. In one or more embodiments, the first device housing 2009 is pivotable about the hinge 2011 relative to the second device housing 2010 between an axially displaced open position, shown at step 2001, and a closed position, shown at step 2003.

At step 2001, the electronic device 2000 is in the axially displaced open position. When in this configuration, the one or more processors (105) of the electronic device 2000 pivot, with an actuator, a carrier carrying an array of mmWave antenna elements relative to a base coupled to a substrate situated within one or both of the first device housing 2009 and/or the second device housing 2010. The one or more processors (105) then determine when a field of view of the array of mmWave antenna elements is oriented toward a best beam of a remote mmWave transmitter, which is the terrestrial cellular tower 2007 in this example. The one or more processors then cause the actuator to cease pivoting the carrier once the field of view is oriented toward this best beam of the terrestrial cellular tower 2007, thereby optimizing the receipt of mmWave signal 2012. This allows mmWave communication to occur across the network 2008.

At step 2002, a user of the electronic device 2000 transitions the electronic device 2000 from the axially displaced open position of step 2001 to the closed position of step 2003. As previously explained, this can constitute a triggering event degrading the ability of the array of mmWave antenna elements to receive the mmWave signals 2012. In one or more embodiments, this physical change of condition of the electronic device 2000 causes the ability of the array of mmWave antenna elements to receive the mmWave signals 2012 to degrade by an amount greater than a predefined degradation threshold. At step 2004, one or more sensors (125) of the electronic device 2000 detect this triggering event.

At step 2005, the one or more processors (105) of the electronic device 2000 cause the actuator to again pivot, in response to the one or more sensors detecting this physical change of condition at step 2004, the carrier carrying the array of mmWave antenna elements relative to the base until the field of view is again oriented toward the best beam of the remote mmWave transmitter. Alternatively, step 2005 can comprise the one or more processors (105) of the electronic device 2000 causing the actuator to again pivot the carrier into which the array of mmWave antenna elements are situated until the field of view is oriented toward the best beam of another mmWave transmitter, provided that beam is better suited to deliver the mmWave signals 2012 after the form factor change.

At step 2006, the one or more processors (105) of the electronic device 2000 optionally repeat the method steps of FIG. 18 to continually, and dynamically, optimize the performance of the mmWave antenna array and/or perform one or more post optimization operations. Repeating the method steps ensures that the mmWave antenna array continues to be optimized in response to each and every triggering event, thereby continually optimizing performance in real time. If a better orientation of the carrier and its array of mmWave antenna elements exists after a triggering event, the actuator pivots to achieve that better orientation. Similarly, if a previous mmWave transmitter is suboptimal based upon the evaluation occurring at step 2005, the carrier can be pivoted until the central axis of the field of view of its array of mmWave antenna elements is oriented toward the best beam of another remote mmWave transmitter. This flow can repeat in each direction, i.e., uplink and downlink, to maintain the performance of the mmWave dynamically.

The post optimization operations of step 2006 can take different forms. In one or more embodiments, the one or more processors (105) of the electronic device 2000 can notify the network service provider that the servicing mmWave transmitter has changed. While this is one viable option, embodiments of the disclosure contemplate that in many situations an electronic device 2000 will not elect to notify the network service provider each time a triggering event occurs. This is true because unnecessary ping-ponging between the electronic device 2000 and the network service provider may actually degrade communication efficiency more than, say, a minor amount of motion of the electronic device. Moreover, if the triggering event is the transition of an electronic device from an axially displaced open position to a closed position, this may occur repeatedly within a short time span, leaving notification unnecessary.

In some embodiments, the one or more processors (105) of the electronic device 2000 can initiate a timer. Embodiments of the disclosure contemplate that some conditions may last longer than others. A person may flip an electronic device open and closed quickly. By contrast, a person may place an electronic device on a metal table and leave it there for a long time. Accordingly, in one or more embodiments the one or more processors (105) of the electronic device 2000 initiate a timer in response to performing a mmWave antenna array optimization via carrier reorientation. When the timer expires, the one or more processors (105) may conclude that the condition resulting from the triggering event will last for a while. Accordingly, the one or more processors (105) may then take another action such as notifying the network service provider that there has been a change in the remote mmWave transmitter in communication with the electronic device 2000.

In a similar manner to initiating a timer, the one or more processors (105) of the electronic device 2000 may use the one or more sensors (125) to monitor for an event indicating that the recently applied mmWave antenna array optimization may be transitory or longer lasting. Illustrating by example, if the electronic device is placed near a metal object, the one or more processors (105) may use the one or more sensors (125) to monitor for motion, changes in temperature, changes in light incident upon the device housing of the electronic device 2000, and so forth to determine whether the present condition will last. If, for instance, the electronic device is moving, this may mean that it is in a purse adjacent to keys, which suggests a shorter duration of the recently applied mmWave antenna array optimization due to the fact that a user may pull the electronic device 2000 from the purse for usage. By contrast, when the electronic device 2000 is stationary against a cold surface such as a metal table, this may indicate that the electronic device 2000 has been placed on a surface while the user is sleeping, for instance, thus indicating that the recently applied mmWave antenna array optimization will be in effect for a longer period of time.

Other post processing operations will be obvious to those of ordinary skill in the art having the benefit of this disclosure. Illustrating by example, the one or more processors (105) of the electronic device 2000 may present a prompt on an exterior display of the electronic device 2000 alerting a user that mmWave antenna element optimization is occurring, and that this may temporarily impede mmWave communication.

Figure 21:
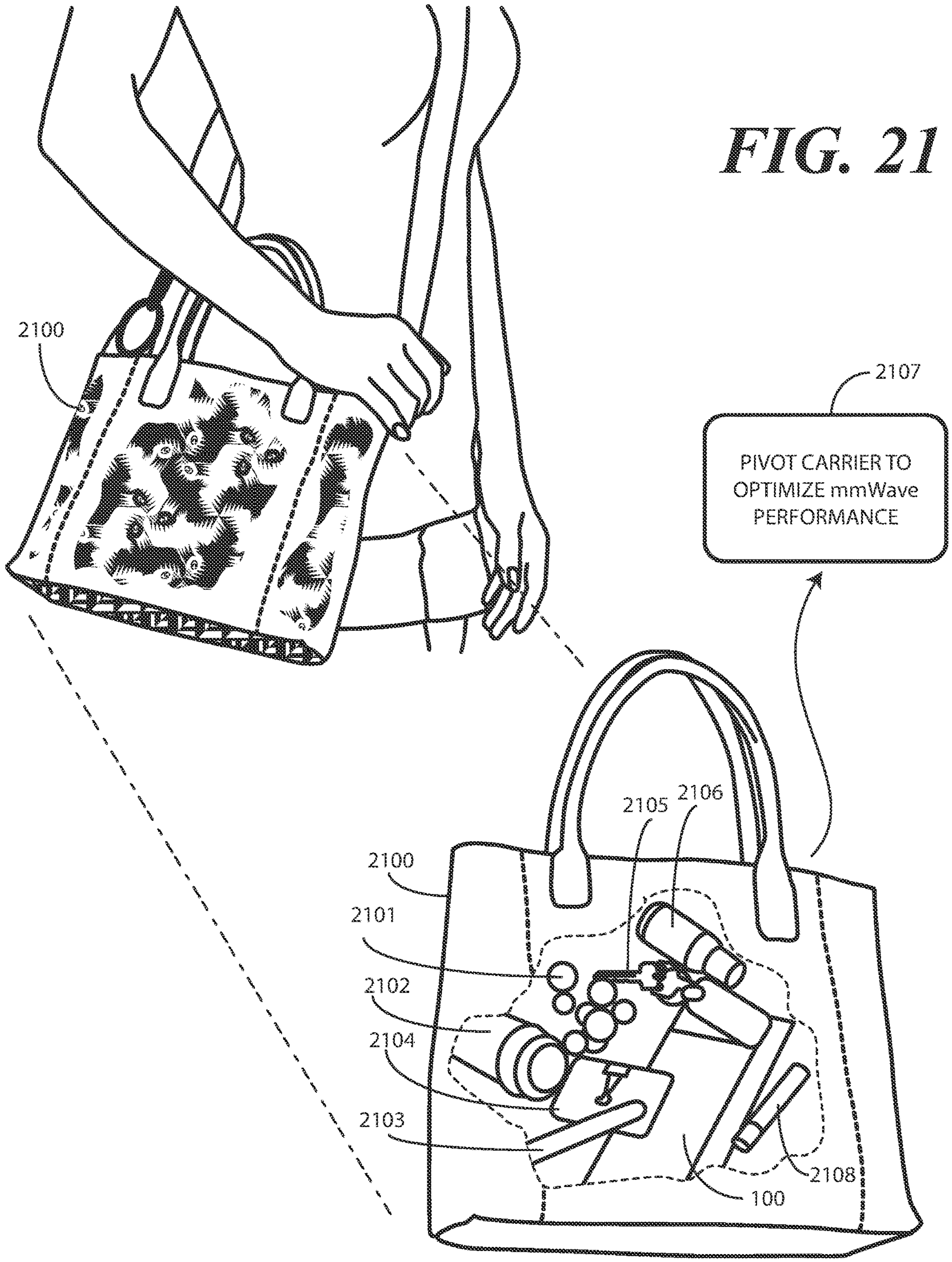
FIG. 21 illustrates one explanatory physical condition that can affect the performance of an antenna assembly pivoted to a particular position in accordance with one or more embodiments of the disclosure.
Figure 22:
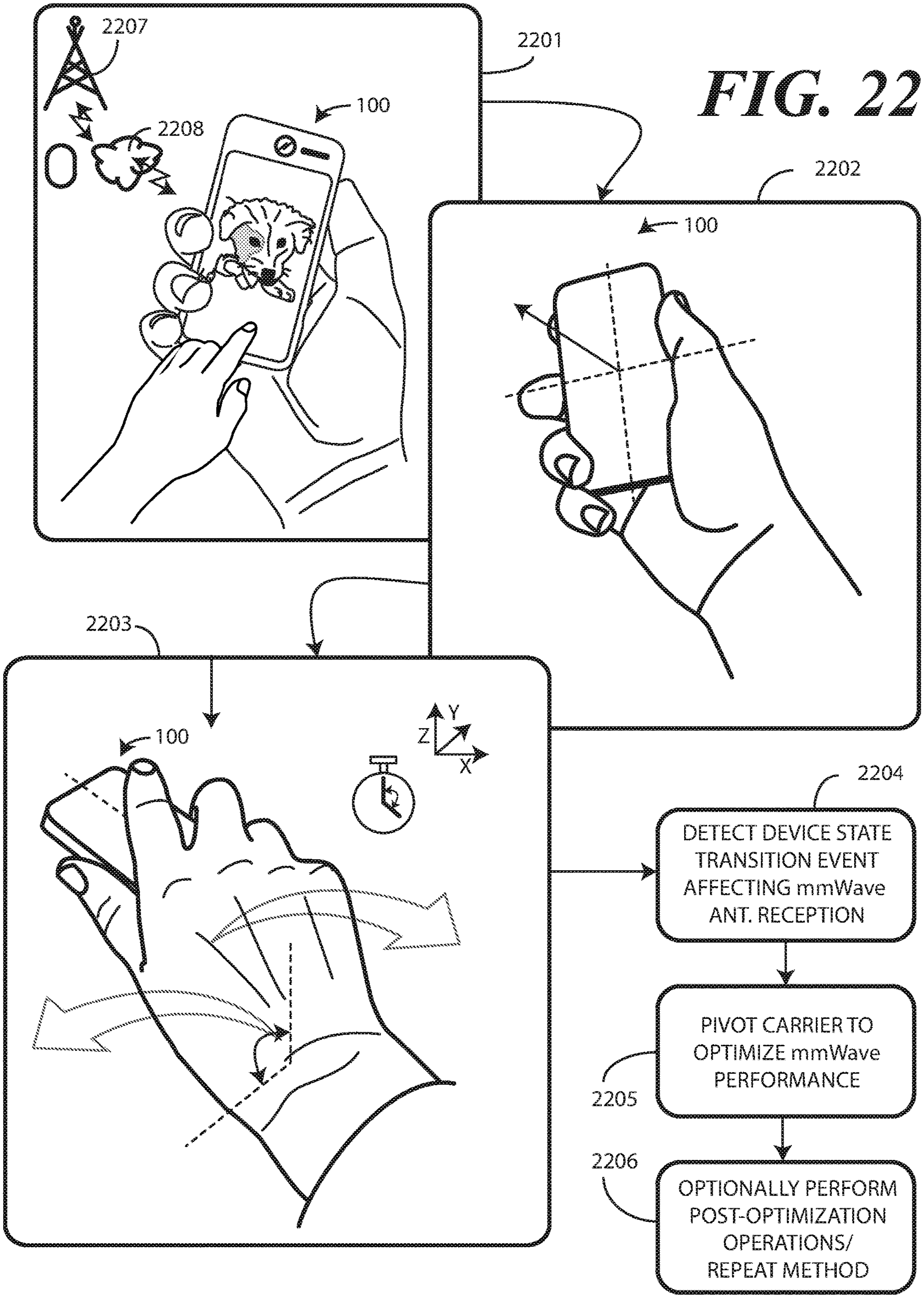
FIG. 22 illustrates another explanatory method in accordance with one or more embodiments of the disclosure.
Figure 23:
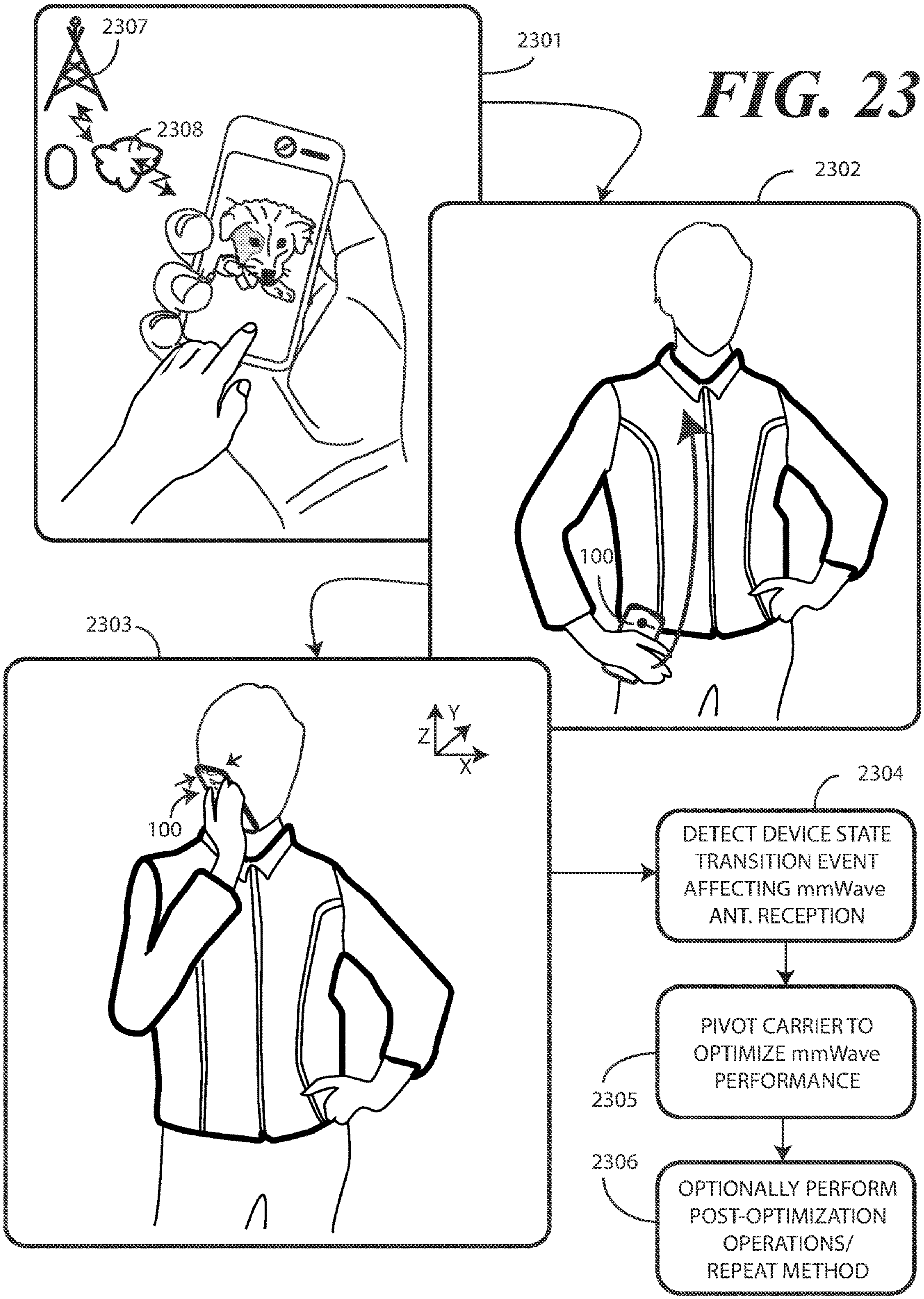
FIG. 23 illustrates still another explanatory method in accordance with one or more embodiments of the disclosure.

Turning now to FIGS. 21-23, illustrated therein are three triggering events contemplated by embodiments of the disclosure. Beginning with FIG. 21, in this example the triggering event is placement of the electronic device 100 into a purse 2100. In this example, the purse 2100 includes numerous items such as coins 2101, medications 2102, grooming items such as fingernail files 2103, notecards 2104, keys 2105, lotions 2106, notepads, lip balm 2108, and other items.

Some of these items, such as the coins 2101 and keys 2105, are metal and can affect the performance of the array of mmWave antenna elements. Accordingly, one or more processors (105) of the electronic device 100 can execute a method 2107 where they again pivot, in response to the one or more sensors detecting this physical change of condition, the carrier carrying the array of mmWave antenna elements relative to the base until the field of view is again oriented toward the best beam of the remote mmWave transmitter or is oriented toward the best beam of another remote mmWave transmitter.

Turning now to FIG. 22, illustrated therein are one or more method steps illustrating how the components of such electronic device can be used to perform dynamic mmWave antenna assembly (120) performance optimization based upon changes in position of an electronic device 100 in three-dimensional space.

Beginning at step 2201, a communication device (112) of an electronic device 100 is in communication with a terrestrial cellular tower 2207 operated by a network service provider operating a communication network 2208.

At step 2202, a user of the electronic device 100 is holding the electronic device with the first major surface oriented upward. Said differently, as shown at step 2202, the user is holding the electronic device 100 with the minor axis oriented normally with the first major surface, shown here as the Z-axis, oriented upward so that the user can see the content being presented on the display. A major axis oriented parallel to the display is oriented such that it runs roughly parallel to the palm of the user's hand, as does a minor axis oriented parallel to the display positioned on the first major surface of the electronic device 100.

At step 2203, the user makes a gesture causing an inversion of the electronic device 100. In this example, the gesture inverts the electronic device 100 along the major axis oriented parallel to the display positioned on the first major surface of the electronic device 100 by causing the minor axis oriented parallel with the display positioned on the first major surface of the electronic device 100 to rotate about the major axis oriented parallel to the display positioned on the first major surface of the electronic device 100. The user could have just as easily performed the inversion by causing the major axis oriented parallel with the display positioned on the first major surface of the electronic device 100 to rotate about the minor axis oriented parallel to the display positioned on the first major surface of the electronic device 100. Either way, this causes the minor axis oriented normally with the first major surface to now point down and away from the face of the user.

At step 2204, one or more motion sensors of the electronic device 100 detect the inversion occurring at step 2203. In one or more embodiments, the one or more motion sensors detect the inversion by detecting a change in an orientation of the electronic device 100 in three-dimensional space. In one or more embodiments, the determination of the change of orientation could be augmented by stationary orientation detection following the inversion, which can be performed once the user stops moving the electronic device 100.

At step 2205, the one or more processors (105) of the electronic device 100 cause the actuator to again pivot, in response to the one or more sensors detecting this physical change of condition at step 2204, the carrier carrying the array of mmWave antenna elements relative to the base until the field of view is again oriented toward the best beam of the remote mmWave transmitter. Alternatively, step 2205 can comprise the one or more processors (105) of the electronic device 100 causing the actuator to again pivot the carrier into which the array of mmWave antenna elements are situated until the field of view is oriented toward the best beam of another mmWave transmitter better suited to deliver the mmWave signals after the form factor change.

At step 2206, the one or more processors (105) of the electronic device 100 optionally repeat the method steps of FIG. 18 to continually, and dynamically, optimize the performance of the mmWave antenna array and/or perform one or more post optimization operations. Repeating the method steps ensures that the mmWave antenna array continues to be optimized in response to each and every triggering event, thereby continually optimizing performance in real time. If a better orientation of the carrier and its array of mmWave antenna elements exists after a triggering event, the actuator pivots to achieve that better orientation. Similarly, if a previous mmWave transmitter is suboptimal based upon the evaluation occurring at step 2205, the carrier can be pivoted until the central axis of the field of view of its array of mmWave antenna elements is oriented toward the best beam of another remote mmWave transmitter. This flow can repeat in each direction, i.e., uplink and downlink, to maintain the performance of the mmWave dynamically.

In one or more embodiments, as shown at step 2203, the inversion occurring in response to the gesture must exceed a predefined rotation threshold for the one or more processors (105) to take action in response to the one or more motion sensors detecting the same. Said differently, in one or more embodiments the one or more motion sensors only detect the inversion of the electronic device 100 when the rotation of the electronic device 100 around the major axis of the electronic device 100 oriented parallel to the display or around the minor axis of the electronic device 100 oriented parallel to the display exceeds a predefined rotation threshold.

In one or more embodiments, the predefined rotation threshold is greater than one hundred degrees. Other predefined rotation thresholds will be obvious to those of ordinary skill in the art having the benefit of this disclosure. In one or more embodiments, the predefined rotation threshold is user-definable using a settings menu in the electronic device 100.

This preclusion of detecting the inversion of the electronic device 100 when the rotation of the electronic device 100 around the major axis of the electronic device oriented parallel to the display or around the minor axis of the electronic device oriented parallel to the display is less than the predefined rotation threshold can occur because the field of view of the array of mmWave antenna elements carried by the carrier is, in one or more embodiments, greater than ninety degrees. If the field of view is even greater, as shown above in FIGS. 16-17, the threshold can be even greater. Thus, there may be no pivoting of the carrier, for example, when reclining back in an easy chair. However, there will be a pivoting of the carrier when the user rotates the electronic device 100 by an amount greater than the field of view of the array of mmWave antenna elements. In one or more embodiments, as shown at step 2203, the inversion occurring in response to the gesture must occur within a predefined duration threshold for the one or more processors (105) to take action.

Turning now to FIG. 23, illustrated therein are one or more method steps illustrating how the components of such electronic device can be used to perform dynamic mmWave antenna assembly (120) performance optimization based upon a lifting gesture.

Beginning at step 2301, a communication device (112) of an electronic device 100 is in communication with a terrestrial cellular tower 2307 operated by a network service provider operating a communication network 2308.

At step 2302, a user of the electronic device 100 makes a lifting gesture transitioning the electronic device 100 from a waist-high position to a more elevated position. As shown at step 2303, the more elevation position has the user's head positioned adjacent to the electronic device 100. When the electronic device 100 is lifted and placed against the head of a user, even when the field of view of the array of mmWave antenna elements is oriented toward a best beam of a remote mmWave transmitter, it may still be desirable to pivot the array of mmWave antenna elements so that the field of view is oriented toward a best beam of another remote mmWave transmitter. This can be desirable to increase operating efficiency, reduce specific absorption rate of mmWave signals, or for other reasons. Accordingly, in one or more embodiments the electronic device 100 includes one or more sensors operable to detect this physical change of condition of the electronic device 100 at step 2304.

At step 2305, the one or more processors (105) of the electronic device 100 cause the actuator to again pivot, in response to the one or more sensors detecting this physical change of condition at step 2304, the carrier carrying the array of mmWave antenna elements relative to the base until the field of view is oriented toward a best beam of another mmWave transmitter that is better suited to deliver the mmWave signals after the lift gesture. At step 2306, the one or more processors (105) of the electronic device 100 optionally repeat the method steps of FIG. 18 to continually, and dynamically, optimize the performance of the mmWave antenna array and/or perform one or more post optimization operations.

Figure 24:
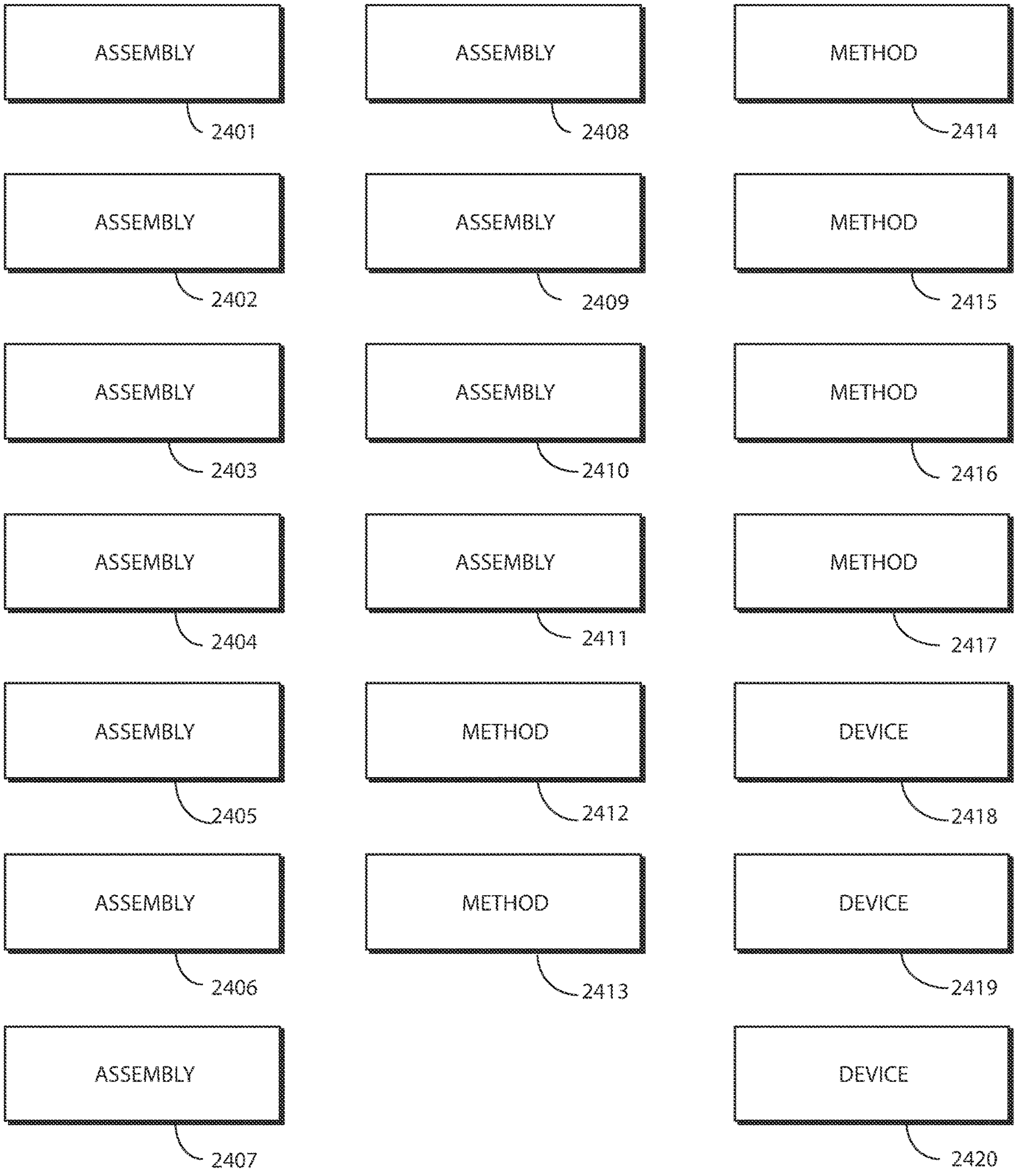
FIG. 24 illustrates various embodiments of the disclosure.

Turning now to FIG. 24, illustrated therein are various embodiments of the disclosure. The embodiments of FIG. 24 are shown as labeled boxes in FIG. 24 due to the fact that the individual components of these embodiments have been illustrated in detail in FIGS. 1-23, which precede FIG. 24. Accordingly, since these items have previously been illustrated and described, their repeated illustration is no longer essential for a proper understanding of these embodiments. Thus, the embodiments are shown as labeled boxes.

At 2401, an antenna assembly for an electronic device comprises an array of millimeter-wave (mmWave) antenna elements situated within a carrier pivotably mounted upon a base coupled to a substrate. At 2401, the antenna assembly comprises an actuator pivoting the carrier relative to the base to change a field of view of the array of mmWave antenna elements.

At 2402, the antenna assembly of 2401 further comprises a flexible substrate comprising one or more flexible conductors electrically coupled to the array of mmWave antenna elements. At 2402, the flexible substrate deforms when the actuator pivots the carrier relative to the base.

At 2403, the actuator of 2402 is coupled to the substrate such that the carrier pivots relative to the substrate when pivoting relative to the base. At 2404, the actuator of 2403 pivots the carrier relative to the base along a single axis. At 2405, the array of mmWave antenna elements of 2404 defines a N×1 matrix, where N represents a number of mmWave antenna elements of the array of mmWave antenna elements.

At 2406, the array of mmWave antenna elements of 2402 comprises a first array having a first field of view and a second array having a second field of view. At 2407, central axes of the first field of view and the second field of view of 2406 are substantially orthogonal. At 2408, the first field of view of 2406 is directed in a direction opposite that of the second field of view. At 2409, the first array and the second array of 2406 each define a N×1 matrix, where N represents a number of mmWave antenna elements of the array of mmWave antenna elements.

At 2410, the array of mmWave antenna elements of 2402 defines a first N×1 matrix having a first field of view, a second N×1 matrix having a second field of view, and a third N×1 matrix having a third field of view. At 2410, the second field of view is oriented substantially orthogonally relative to the first field of view and the second field of view.

At 2411, the antenna assembly of 2401 further comprises another actuator pivoting the substrate. At 2411, the actuator pivots the carrier relative to the base around a first axis, while the other actuator pivots the substrate around a second axis. At 2411, the first axis and the second axis are substantially orthogonal.

At 2412, a method of controlling an antenna assembly in an electronic device comprises pivoting, with an actuator, a carrier carrying an array of mmWave antenna elements relative to a base coupled to a substrate situated inside a housing of the electronic device. At 2412, the method comprises determining, with one or more processors, that a field of view of the array of mmWave antenna elements is oriented toward a best beam of a remote mmWave transmitter. At 2412, the method comprises ceasing, with the actuator, the pivoting once the field of view is oriented toward the best beam of the remote mmWave transmitter.

At 2413, the method of 2412 further comprises detecting, with one or more sensors, a physical change of condition of the electronic device. At 2413, the method comprises again pivoting, in response to the one or more sensors detecting the physical change of condition, the carrier carrying the array of mmWave antenna elements relative to the base until the field of view is again oriented toward the best beam of the remote mmWave transmitter or is oriented toward the best beam of another remote mmWave transmitter.

At 2414, the physical change of condition of 2413 comprises a person becoming proximately situated with the electronic device. At 2415, the physical change of condition of 2413 comprises motion of the electronic device.

At 2415, the electronic device of 2413 comprises a first device housing that is movable relative to a second device housing. At 2415, the physical change in condition comprises a first device housing moving relative to the second device housing. At 2416, the physical change of condition of 2413 comprises an ability to receive a mmWave signal from the remote mmWave transmitter degrading by an amount greater than a predefined degradation threshold.

At 2417, an electronic device comprises a device housing. At 2417, the electronic device comprises a communication device situated within the device housing and operable with an array of mmWave antenna elements electrically coupled to the communication device by a flexible substrate and situated within a carrier that is pivotable relative to a base.

At 2417, an actuator is operable to pivot the carrier relative to the base. At 2417, one or more processors are operable with the actuator and cause the actuator to pivot the carrier relative to the base to optimize mmWave signal reception by the array of mmWave antenna elements.

At 2419, the electronic device of 2418 further comprises one or more sensors. At 2419, the one or more processors cause the actuator to pivot the carrier relative to the base in response to the one or more sensors detecting a change in a physical condition of the electronic device.

At 2420, the carrier of 2419 is situated at an end of the device housing. At 2420, the array of mmWave antenna elements defines a N×1 matrix, where N represents a number of mmWave antenna elements of the array of mmWave antenna elements. At 2420, the carrier is pivotable relative to the base around an axis within an angle of rotation spanning more than ninety degrees.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a device housing;
a communication device situated within the device housing and operable with an array of millimeter-wave (mmWave) antenna elements electrically coupled to the communication device by a flexible substrate and situated within a carrier that is pivotable relative to a base coupled to two ends of the carrier;
an actuator situated adjacent to the base operable to pivot the carrier relative to the base about a fixed axis passing through each of the carrier, the base, and the actuator; and
one or more processors operable with the actuator, the one or more processors causing the actuator to pivot the carrier relative to the base to optimize mmWave signal reception by the array of mmWave antenna elements.

2. The electronic device of claim 1, further comprising one or more sensors, the one or more processors causing the actuator to pivot the carrier relative to the base in response to the one or more sensors detecting a change in a physical condition of the electronic device.

3. The electronic device of claim 2, wherein:
the carrier is situated at an end of the device housing;
the array of mmWave antenna elements defines an N×1 matrix, where N represents a number of mmWave antenna elements of the array of mmWave antenna elements; and the carrier is pivotable relative to the base around an axis within an angle of rotation spanning more than ninety degrees.

4. The electronic device of claim 1, wherein the carrier defines a peninsular opening through which the flexible substrate passes, and the flexible substrate deforms when the actuator pivots the carrier.

5. The electronic device of claim 4, wherein the carrier pivots along a single axis centrally through the carrier along a major dimension of the carrier.

6. The electronic device of claim 5, wherein the array of mmWave antenna elements defines an N×1 matrix, wherein N represents a number of mmWave antenna elements of the array of antenna elements.

7. The electronic device of claim 4, wherein the array of mmWave element comprises a first array having a first field of view and a second array having a second field of view.

8. The electronic device of claim 7, wherein central axes of the first field of view and the second field of view are substantially orthogonal.

9. The electronic device of claim 7, wherein the base is defined by a substrate-engaging surface having a first carrier support extending distally from a first end of the substrate-engaging surface and a second carrier support extending distally from a second end of the substrate-engaging surface, with the carrier situated between the first carrier support and the second carrier support and the first carrier support situated between the actuator and the carrier.

10. The electronic device of claim 9, wherein the second carrier support defines an aperture axially aligned with the fixed axis and the first array and the second array each define an N×1 matrix, where N represents a number of mmWave antenna elements of the array of mmWave antenna elements.

11. The electronic device of claim 1, wherein the array of mmWave antenna elements defines a first N×1 matrix having a first field of view, a second N×1 matrix having a second field of view, and a third N×1 matrix having a third field of view, wherein the second field of view is oriented substantially orthogonally relative to the first field of view and the second field of view.

12. The electronic device of claim 1, further comprising a second actuator pivoting a substrate to which the base is coupled, the base, the actuator, and the carrier about a second axis passing through the substrate, the base, and the carrier that is substantially orthogonal with the fixed axis.

13. An electronic device, comprising:

a device housing;

a communication device situated within the device housing and operable with an array of millimeter-wave (mmWave) antenna elements electrically coupled to the communication device by a flexible substrate and situated within a carrier that is pivotable relative to a base defined by a substrate-engaging surface having a first carrier support extending distally from a first end of the substrate-engaging surface and a second carrier support extending distally from a second end of the substrate-engaging surface, with the carrier situated between the first carrier support and the second carrier support;

a flat substrate coupled to the base;

an actuator coupled to the flat substrate and situated outside the base with the first carrier support situated between the actuator and the carrier, and operable to pivot the carrier relative to the base and the flat substrate about an axis oriented substantially parallel with a major surface of the flat substrate; and one or more processors operable with the actuator, the one or more processors causing the actuator to pivot the carrier relative to the base to optimize mmWave signal reception by the array of mmWave antenna elements.

14. The electronic device of claim 13, wherein the flat substrate has a length and a width that is less than the length.

15. The electronic device of claim 14, wherein the axis is fixed and oriented substantially parallel with the length.

16. The electronic device of claim 13, wherein the base defines a first surface abutting the flat substrate a second surface extending distally from the first surface and a third surface extending distally from the first surface.

17. The electronic device of claim 16, wherein the carrier is pivotably mounted at a pivotable mount between the second surface and the third surface.

18. The electronic device of claim 17, wherein the second surface and the third surface are substantially parallel and suspend the carrier above the first surface with a wall of the carrier defining an opening at an end of the wall through which the flexible substrate may pass.

19. The electronic device of claim 17, further comprising lubricants added to the pivotable mount to facilitate more efficient pivoting between the carrier and the base.

20. An electronic device, comprising:

a device housing;

a communication device situated within the device housing and operable with an array of millimeter-wave (mmWave) antenna elements electrically coupled to the communication device by a flexible substrate and situated within a carrier that is pivotable relative to a base comprising a first surface and a second surface extending distally from, and separated by, a third surface;

an actuator operable to pivot the carrier relative to the base about an axis passing through each of the carrier, the first surface, the second surface, and the actuator; and one or more processors operable with the actuator, the one or more processors causing the actuator to pivot the carrier relative to the base to optimize mmWave signal reception by the array of mmWave antenna elements.

* * * * *